(12) United States Patent
Kiss et al.

(10) Patent No.: US 8,410,230 B2
(45) Date of Patent: Apr. 2, 2013

(54) POLYMERIZATION PROCESSES FOR BROADENED MOLECULAR WEIGHT DISTRIBUTION

(75) Inventors: Gabor Kiss, Hampton, NJ (US); Robert Patrick Reynolds, Jr., Clinton, NJ (US); John W. Chu, Neshanic Station, NJ (US); Patrick Brant, Seabrook, TX (US); James Richardson Lattner, LaPorte, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 13/088,622

(22) Filed: Apr. 18, 2011

(65) Prior Publication Data

US 2011/0196115 A1 Aug. 11, 2011

Related U.S. Application Data

(62) Division of application No. 12/454,514, filed on May 19, 2009, now Pat. No. 7,939,610.

(51) Int. Cl.
*C08F 2/00* (2006.01)

(52) U.S. Cl. .................. 526/87; 526/65; 526/78; 526/86

(58) Field of Classification Search .................... 526/65, 526/66
See application file for complete search history.

(56) References Cited

U.S. PATENT DOCUMENTS

| | | | | |
|---|---|---|---|---|
| 5,648,438 | A * | 7/1997 | Henry et al. | 526/65 |
| 6,319,998 | B1 * | 11/2001 | Cozewith et al. | 526/65 |
| 6,875,826 | B1 * | 4/2005 | Huovinen et al. | 526/64 |
| 2008/0090974 | A1 * | 4/2008 | Brant et al. | 526/64 |

* cited by examiner

*Primary Examiner* — David W Wu
*Assistant Examiner* — Elizabeth Eng
(74) *Attorney, Agent, or Firm* — Robert A. Migliorini

(57) ABSTRACT

Provided are methods of producing polymers with broadened molecular weight and/or composition distribution in a continuous homogeneous polymerization system utilizing reactor temperature gradients, reactor polymer concentration gradients, monomer concentration gradients, catalyst concentration gradients, and combinations thereof in the polymerization reactor. Such methods are particularly suitable when utilizing metallocene catalysts and other single-site catalysts, which generally produce polymers with narrow molecular weight and composition distribution.

11 Claims, 7 Drawing Sheets

POLYMERIZATION PROCESSES FOR BROADENED MOLECULAR WEIGHT DISTRIBUTION

CROSS-REFERENCE TO RELATED APPLICATIONS

This application is a divisional application filed under 37 C.F.R. 1.53(b) of parent application serial number U.S. Ser. No. 12/454,514, the entirety of which is hereby incorporated herein by reference, which claims priority to U.S. Provisional Application Ser. No. 61/128,534 filed May 22, 2008, herein incorporated by reference in its entirety.

FIELD

The present disclosure relates to the field of olefin polymerization. It more particularly relates to methods for producing polymers with broadened molecular weight and/or composition distribution. Still more particularly, it relates to continuous processes for producing polymers with broadened molecular weight and/or composition distribution in a homogeneous polymerization system.

BACKGROUND

Polymers produced from metallocene catalysts and other single site catalysts generally produce polymers with narrow molecular weight distribution (also designated MWD), commonly characterized by the ratio of weight-averaged/number-averaged molecular weights ($M_w/M_n$), in well-mixed reactors. For example, the $M_w/M_n$ values for polymers made with metallocene catalyst systems in homogeneous polymerization media are typically close to the statistically expected value of 2.0 (for the description of metallocene, Ziegler-Natta, and other olefin polymerization catalysts see J. Scheirs, W. Kaminsky, Ed., "Metallocene-Based Polyolefins", Wiley, New York, 2000; E. P. Moore, Jr., Ed, "Polypropylene Handbook", Hanser, New York, 1996; L. S. Baugh, J. A. M. Canich, Ed., "Stereoselective Polymerization With Single-Site Catalysts", CRC, New York, 2008). Other catalysts of commercial significance (such as Ziegler-Natta), however, make polymers with much broader MWD. Single site catalysts, such as, for example, metallocenes, also produce narrow composition distribution. The composition distribution is the distribution of monomer composition and/or crystallinity from polymer molecule to molecule within the bulk polymer. For, example, isotactic polypropylenes made with Ziegler-Natta catalysts often have $M_w/M_n$ values as high as 4-6, and a broad crystallinity distribution.

While narrow MWD and narrow CD generally conveyed by metallocene catalysts may be advantageous in some applications, there are certain applications where a narrower MWD and CD are deleterious, for example in melt processing and solid state processing (orientation) of polymers. In particular, in film processing and fiber processing applications, a broader molecular weight distribution provides particular advantages in both melt processability and orientation processability. Prior-art approaches for broadening molecular weight distribution include in-situ approaches, such as utilizing series or parallel reactors and also the use of mixed catalysts. Melt-blending in an extruder of polymer components with differing distributions of molecular weight to provide for broadened molecular weight distribution is also widely practiced. These prior-art methods for broadening molecular weight distribution add both process complexity and cost.

Hence, there is a need for alternative approaches to tailoring the MWD and CD of polymers produced from single site type catalysts so as to produce polymers with a broader molecular weight distribution in a continuous homogeneous polymerization process.

SUMMARY

Provided are methods of producing polymers with broadened molecular weight and/or composition distribution in a continuous single reactor operating with a homogeneous polymerization system.

According to the present disclosure, a continuous process for producing polymers with broadened molecular weight and/or composition distribution in a homogeneous polymerization system, comprises: (a) providing a tubular, a loop or a stirred tank reactor with one or more feed entry ports; (b) feeding to the reactor through the one or more feed entry ports one or more reactor feed streams comprising: 1) one or more monomers; 2) one or more catalyst systems; 3) optional one or more scavengers; 4) optional one or more diluents or solvents; and 5) combinations thereof, wherein the reactor is at a temperature above the solid-fluid phase-transition temperature of the polymerization system and a pressure no lower than 10 MPa below the cloud point pressure of the polymerization system and less than 1500 MPa, wherein the polymerization system for the reactor is in its dense fluid state and comprises the one or more monomers, any diluent or solvent present, any scavenger present, and the polymer product, wherein the one or more catalyst systems comprise one or more catalyst precursors, one or more catalyst activators, and optionally, one or more catalyst supports, wherein the one or more catalyst precursors are chosen from metallocene catalysts, non-metallocene metal-centered, heteroaryl ligand catalysts, and late transition metal catalysts; and (c) forming a polymer reactor effluent including a homogeneous fluid phase polymer-monomer mixture in the reactor, wherein a temperature gradient in the reactor is greater than 15° C., wherein the temperature gradient is defined as the temperature in the reactor at 5% of the reactor length minus the temperature in the reactor at the reactor exit port, and wherein the Mw/Mn of the polymer product is greater than 2.3.

A further aspect of the present disclosure relates to a continuous process for producing polymers with broadened molecular weight and/or composition distribution in a homogeneous polymerization system, comprising: (a) providing a tubular, a loop or a stirred tank reactor with one or more feed entry ports; (b) feeding to the reactor through the one or more feed entry ports one or more reactor feed streams comprising: 1) one or more monomers; 2) one or more catalyst systems; 3) optional one or more scavengers; 4) optional one or more diluents or solvents; and 5) combinations thereof, wherein the reactor is at a temperature above the solid-fluid phase-transition temperature of the polymerization system and a pressure no lower than 10 MPa below the cloud point pressure of the polymerization system and less than 1500 MPa, wherein the polymerization system for the reactor is in its dense fluid state and comprises the one or more monomers, any diluent or solvent present, any scavenger present, and the polymer product, wherein the one or more catalyst systems comprise one or more catalyst precursors, one or more catalyst activators, and optionally, one or more catalyst supports, wherein the one or more catalyst precursors are chosen from metallocene catalysts, non-metallocene metal-centered, heteroaryl ligand catalysts, and late transition metal catalysts; and (c) forming a polymer reactor effluent including a homogeneous fluid phase polymer-monomer mixture in the reactor, wherein the reactor includes a means for minimizing back-mixing of the polymerization system to create a polymer concentration gradient of 20 wt % or more, and wherein the polymer concentration gradient is defined as the polymer concentration in the reactor effluent minus the polymer concentration in a first reactor zone of a baffled reactor or at 5% of the reactor length downstream of the feed entry port closest to the reactor head of a baffle-free reactor, and wherein the Mw/Mn of polymer product is greater than 2.3.

Another aspect of the present disclosure relates to a continuous process for producing polymers with broadened molecular weight and/or composition distribution in a homogeneous polymerization system, comprising: (a) providing a tubular, a loop or a stirred tank reactor with two or more feed entry ports; (b) feeding to the reactor through the two or more feed entry ports two or more reactor feed streams comprising: 1) two or more monomers; 2) one or more catalyst systems; 3) optional one or more scavengers; 4) optional one or more diluents or solvents; and 5) combinations thereof, wherein the reactor is at a temperature above the solid-fluid phase-transition temperature of the polymerization system and a pressure no lower than 10 MPa below the cloud point pressure of the polymerization system and less than 1500 MPa, wherein the polymerization system for the reactor is in its dense fluid state and comprises the two or more monomers, any diluent or solvent present, any scavenger present, and the polymer product, wherein the one or more catalyst systems comprise one or more catalyst precursors, one or more catalyst activators, and optionally, one or more catalyst supports, wherein the one or more catalyst precursors are chosen from metallocene catalysts, non-metallocene metal-centered, heteroaryl ligand catalysts, and late transition metal catalysts; wherein at least one of the monomers is fed to the reactor at an upstream feed entry port and at least one of the monomers is fed to the reactor at one or more downstream feed entry ports, wherein the total number of monomers fed to the reactor through the upstream feed entry port is less than the total number of monomers fed to the reactor through the upstream feed entry port and the one or more downstream feed entry ports; and (c) forming a polymer reactor effluent including a homogeneous fluid phase polymer-monomer mixture in the reactor, wherein the concentration of at least one monomer in the polymerization system in a first reactor zone in a baffled reactor or at 5% downstream of the reactor length from the upstream feed entry port of a baffle-free reactor is at least 5% different from the concentration of the same at least one monomer in the polymerization system at the one or more downstream feed entry ports, and wherein the Mw/Mn of the polymer product is greater than 2.3.

A still further aspect of the present disclosure relates to a continuous process for producing polymers with broadened molecular weight and/or composition distribution in a homogeneous polymerization system, comprising: (a) providing a tubular, a loop or a stirred tank reactor with two or more feed entry ports; (b) feeding to the reactor through the two or more feed entry ports two or more reactor feed streams comprising: 1) one or more monomers; 2) two or more catalyst systems; 3) optional one or more scavengers; 4) optional one or more diluents or solvents; and 5) combinations thereof, wherein the reactor is at a temperature above the solid-fluid phase-transition temperature of the polymerization system and a pressure no lower than 10 MPa below the cloud point pressure of the polymerization system and less than 1500 MPa, wherein the polymerization system for the reactor is in its dense fluid state and comprises the one or more monomers, any diluent or solvent present, any scavenger present, and the polymer product, wherein the two or more catalyst systems comprise one or more catalyst precursors, one or more catalyst activators, and optionally, one or more catalyst supports, wherein the one or more catalyst precursors are chosen from metallocene catalysts, non-metallocene metal-centered, heteroaryl ligand catalysts, and late transition metal catalysts; and wherein at least one of the catalyst systems is fed to the reactor at an upstream feed entry port of the reactor and at least one of the catalyst systems is fed to the reactor at one or more downstream feed entry ports of the reactor, wherein the total number of catalyst precursors or catalyst activators comprising the catalyst system in the reactor at the upstream feed entry port is less than the total number of catalyst precursors or catalyst activators of the catalyst system in the reactor at the one or more downstream feed entry ports; and (c) forming a polymer reactor effluent including a homogeneous fluid phase polymer-monomer mixture in the reactor, wherein the concentration of at least one catalyst precursor or one catalyst activator component of the catalyst system in a first reactor zone in a baffled reactor or at 5% downstream of the reactor length from the upstream feed entry port of a baffle-free reactor is at least 5% different from the concentration of the same at least one catalyst precursor or one catalyst activator component of the catalyst system at the one or more downstream feed entry ports, and wherein the Mw/Mn of the polymer product is greater than 2.3.

A still further aspect of the present disclosure relates to a continuous process for producing polymers with broadened molecular weight and/or composition distribution in a homogeneous polymerization system, comprising: (a) providing a tubular, a loop or a stirred tank reactor with two or more feed entry ports; (b) feeding to the reactor through the two or more feed entry ports two or more reactor feed streams comprising: 1) two or more monomers; 2) two or more catalyst systems; 3) optional one or more scavengers; 4) optional one or more diluents or solvents; and 5) combinations thereof, wherein the reactor is at a temperature above the solid-fluid phase-transition temperature of the polymerization system and a pressure no lower than 10 MPa below the cloud point pressure of the polymerization system and less than 1500 MPa, wherein the polymerization system for the reactor is in its dense fluid state and comprises the two or more monomers, any diluent or solvent present, any scavenger present, and the polymer product, wherein the two or more catalyst systems comprise one or more catalyst precursors, one or more activators, and optionally, one or more catalyst supports, wherein the one or more catalyst precursors are chosen from metallocene catalysts, non-metallocene metal-centered, heteroaryl ligand catalysts, and late transition metal catalysts, wherein at least one of the monomers is fed to the reactor at an upstream feed entry port and at least one of the monomers is fed to the reactor at one or more downstream feed entry ports, wherein the total number of monomers fed to the reactor through the upstream feed entry port is less than the total number of monomers fed to the reactor through the upstream feed entry port and the one or more downstream feed entry ports, wherein at least one of the catalyst systems is fed to the reactor at an upstream feed entry port of the reactor and at least one of the catalyst systems is fed to the reactor at one or more downstream feed entry ports of the reactor, wherein the total number of catalyst precursors or catalyst activators comprising the catalyst system in the reactor at the upstream feed entry port is less than the total number of catalyst precursors or catalyst activators of the catalyst system in the reactor at the one or more downstream feed entry ports; and (c) forming a polymer reactor effluent including a homogeneous fluid phase polymer-monomer mixture in the reactor, wherein a temperature gradient in the reactor is greater than 15° C., wherein the temperature gradient is defined as the temperature in the reactor at 5% of the reactor length minus the temperature in the reactor at the reactor exit port, wherein the reactor includes a means for minimizing back-mixing of the polymerization system to create a polymer concentration gradient of 20 wt % or more, wherein the polymer concentration gradient is defined as the polymer concentration in the reactor effluent minus the polymer concentration in a first zone of a baffled reactor or at 5% of the reactor length downstream of the feed entry port closest to the reactor head of a baffle-free reactor, wherein the concentration of at least one monomer in the polymerization system in the first reactor zone in a baffled reactor or at 5% downstream of the reactor length from the upstream feed entry port of a baffle-free reactor is at least 5% different from the concentration of the same at least one monomer in the polymerization system at the one or more downstream feed entry ports, wherein the concentration of at least one catalyst precursor or one catalyst activator component of the catalyst system in the first reactor zone in a baffled reactor or at 5% downstream of the reactor length from the upstream feed entry port of a baffle-free reactor is at least 5% different from the concentration of the same at least one catalyst precursor or one catalyst activator component of the catalyst system at the one or more downstream feed entry ports, and wherein the Mw/Mn of the polymer product is greater than 2.3.

These and other features and attributes of the disclosed processes for producing polymers with broadened molecular weight and/or composition distribution and their advantageous applications and/or uses will be apparent from the detailed description that follows, particularly when read in conjunction with the figures appended hereto.

BRIEF DESCRIPTION OF THE DRAWINGS

To assist those of ordinary skill in the relevant art in making and using the subject matter hereof, reference is made to the appended drawings, wherein.

DEFINITIONS

For purposes of this disclosure and the claims thereto.

A catalyst system is defined to be the combination of one or more catalyst precursor compounds and one or more activators. Note that although themselves are not catalytically active (need to be combined with an activator to become active), the catalyst precursor compounds are often referred to as catalysts in the art of polymerization. Any part of the catalyst system can be optionally supported on solid particles, in which case the support is also part of the catalyst system.

Dense fluids are defined as fluid media in their liquid or supercritical state with densities greater than 300 kg/m$^3$. Note that gas-phase fluids are excluded from the group of dense fluids.

Figure 7:
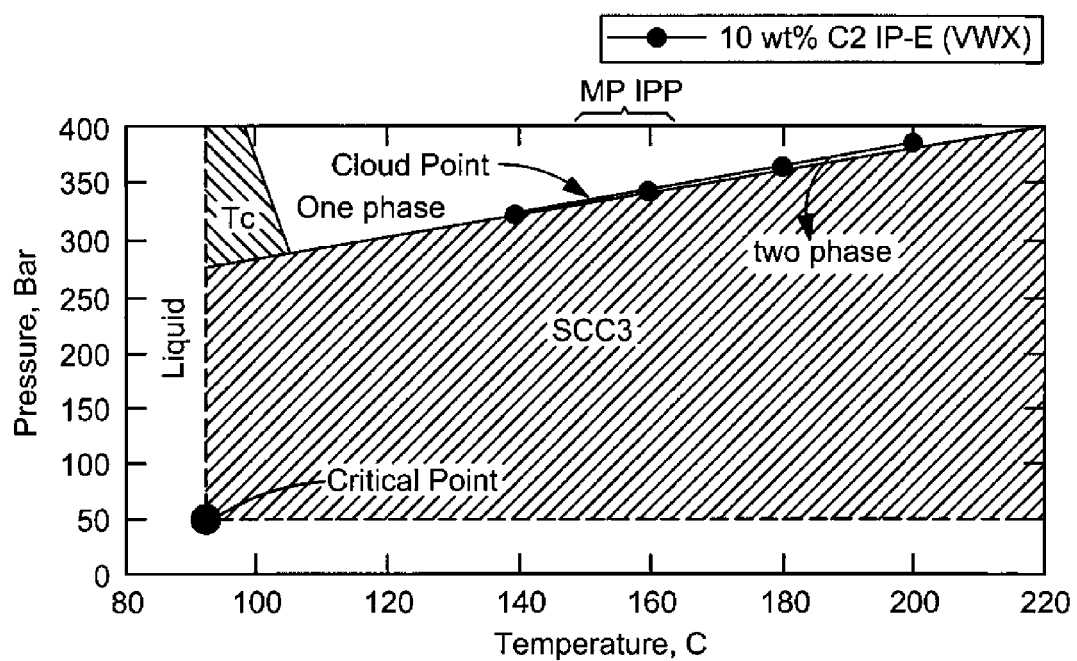
FIG. 7 depicts a basic phase diagram for mixtures of propylene monomer with selected polymers (isotactic polypropylene—iPP, syndiotactic polypropylene—sPP, atactic polypropylene—aPP, or propylene-ethylene copolymer).

Solid-fluid phase transition temperature is defined as the temperature at which a solid polymer phase separates from the polymer-containing dense fluid medium at a given pressure. Note that the solid-fluid phase transition temperature is indicated by the crystallization temperature line in FIG. 7. Note also that in polymer-solvent (the solvent could be the dense fluid monomer itself or monomer-inert solvent blends) systems the crystallization and melting temperatures (the latter defined as the temperature at which a solid polymer dissolves in the surrounding dense fluid medium) are often not the same. In fact, the dissolution of solid polymers typically requires significantly higher temperatures than the solid-fluid phase transition temperature. The solid-fluid phase transition temperature can be determined by temperature reduction starting from temperatures at which the polymer is fully dissolved in the dense fluid reaction medium. At the onset of the formation of a solid polymer phase, the homogeneous fluid medium becomes turbid, which can be observed by eye or can be detected by shining a laser through the medium and detecting the sudden increase of light scattering as described in J. Vladimir Oliveira, C. Dariva and J. C. Pinto, Ind. Eng, Chem. Res. 29 (2000) 4627.

Solid-fluid phase transition pressure (crystallization pressure) is defined as the pressure at which a solid polymer phase separates from the polymer-containing fluid medium at a given temperature. The solid-fluid phase transition pressure can be determined by pressure reduction at constant temperature starting from pressures at which the polymer is fully dissolved in the fluid reaction medium. At the onset of the formation of a solid polymer phase, the homogeneous fluid medium becomes turbid, which can be observed by eye or can be detected by shining a laser through the medium and detecting the sudden increase of light scattering as described in J. Vladimir Oliveira, C. Dariva and J. C. Pinto, Ind. Eng, Chem. Res. 29 (2000) 4627.

The cloud point is defined as the pressure below which, at a given temperature, the polymer-containing homogeneous fluid medium becomes turbid upon pressure reduction at constant temperature as described in J. Vladimir Oliveira, C. Dariva and J. C. Pinto, Ind. Eng, Chem. Res. 29 (2000) 4627. For purposes of this disclosure and the claims thereto, the cloud point is measured by shining a helium laser through the selected polymerization system in a cloud point cell onto a photocell and recording the pressure at the onset of rapid increase in light scattering for a given temperature.

A higher α-olefin is defined as an α-olefin having four or more carbon atoms.

Polymerization encompasses any polymerization reaction such as homopolymerization and copolymerization.

Copolymerization encompasses any polymerization reaction of two or more monomers.

The new numbering scheme for the Periodic Table Groups is used as published in CHEMICAL AND ENGINEERING NEWS, 63(5), 27 (1985).

When a polymer is referred to as comprising an olefin, the olefin present in the polymer is the polymerized form of the olefin.

An oligomer is defined to be compositions having 2-75 monomer units.

A polymer is defined to be compositions having 76 or more monomer units.

A series reactor cascade (also referred to as series reactor configuration or reactors in series) includes two or more reactors connected in series, in which the effluent of an upstream reactor is fed to the next reactor downstream in the reactor cascade. Besides the effluent of the upstream reactor(s), the feed of any reactor can be augmented with any combination of additional monomer, catalyst, scavenger, or solvent fresh or recycled feed streams.

Reactor train or reactor branch or reactor leg refers to a single polymerization reactor or to a group of polymerization reactors of the in-line blending process disclosed herein that produces a single polymer blend component. If the reactor train contains more than one reactor, the reactors are arranged in a series configuration within the train. The need for having more than one reactor in a reactor train may, for example, arise when an in-line blend component cannot be produced at the desired rate economically in a single reactor but there could be also reasons related to blend component quality, such as molecular weight or composition distribution, etc. Since a reactor train can comprise multiple reactors and/or reactor zones in series, the single blend component produced in a reactor train may itself be a polymer blend of polymeric components with varying molecular weights and/or compositions. However, in order to simplify the description of different embodiments of the processes disclosed herein, the polymeric product of a reactor train is referred to simply as blend component or polymeric blend component regardless of its molecular weight and/or compositional dispersion. For the purpose of defining the process of the present disclosure, parallel reactors will be considered as separate reactor trains even if they produce essentially the same in-line blend component. Also, spatially separated, parallel reaction zones that do not exchange or mix reaction mixtures by, for example, pump-around loops, or by other recirculation methods, will be considered as separate parallel reactor trains even when those parallel zones are present in a common shell and fall within the in-line blending process disclosed herein.

Reactor bank refers to the combination of all polymerization reactors in the polymerization section of the in-line polymer blending process disclosed herein. A reactor bank may comprise one or more reactor trains.

A parallel reactor configuration includes two or more reactors or reactor trains connected (also referred to as fluidly connected) in parallel. A reactor train, branch, or leg may include one reactor or alternatively more than one reactor configured in a series configuration. For example, a reactor train may include two, or three, or four, or more reactors in series. The entire parallel reactor configuration of the polymerization process disclosed herein, i.e., the combination of all parallel polymerization reactor trains forms the reactor bank.

Polymerization system is defined to be the monomer(s) plus comonomer(s) plus polymer(s) plus optional inert solvent(s)/diluent(s) plus optional scavenger(s). Note that for the sake of convenience and clarity, the catalyst system is addressed separately in the present discussion from other components present in a polymerization reactor. In this regard, the polymerization system is defined here narrower than customary in the art of polymerization that typically considers the catalyst system as part of the polymerization system. In the current definition, the mixture present in the polymerization reactor and in its effluent is composed of the polymerization system plus the catalyst system.

A homogeneous polymerization system contains all of its components in a single phase dispersed and mixed on a molecular scale. In our discussions, homogeneous polymerization systems are meant to be in their dense fluid (liquid or supercritical) state. Note that our definition of the polymerization system does not include the catalyst system, thus the catalyst system may or may not be homogeneously dissolved in the polymerization system. A homogeneous system may have regions with concentration gradients, but there would be no sudden, discontinuous changes of composition on a micrometer scale within the system as it is the case when, for example, solid polymer-containing particles are suspended in a dense fluid. In practical terms, a homogeneous polymerization system has all of its components in a single dense fluid phase. Apparently, a polymerization system is not homogeneous when it is partitioned to more than one fluid phase or to a fluid and a solid phase. The homogeneous fluid state of the polymerization system is represented by the single fluid (liquid or supercritical fluid) region in its phase diagram.

Pure substances, including all types of hydrocarbons, can exist in either a subcritical, or supercritical state, depending on their temperature and pressure. To be in the supercritical state, a substance must have a temperature above its critical temperature (Tc) and a pressure above its critical pressure (Pc). Mixtures of hydrocarbons, including mixtures of monomers, polymers, and optionally inert solvents, have pseudo-critical temperatures (Tc) and pseudo-critical pressures (Pc), which for many systems can be approximated by mole-fraction-weighted averages of the corresponding critical properties (Tc or Pc) of the mixture's components. Mixtures with a temperature above their pseudo-critical temperature and a pressure above their pseudo-critical pressure will be said to be in a supercritical state or phase, and the thermodynamic behavior of supercritical mixtures will be analogous to supercritical pure substances. For purposes of this disclosure, the critical temperatures (Tc) and critical pressures (Pc) of certain pure substances relevant to the current disclosure are those that found in the Handbook of Chemistry and Physics, David R. Lide, Editor-in-Chief, 82nd edition 2001-2002, CRC Press, LLC. New York, 2001. In particular, the Tc and Pc of selected substances are:

| Name | Tc (K) | Pc (MPa) |
|---|---|---|
| Hexane | 507.6 | 3.025 |
| Isobutane | 407.8 | 3.64 |
| Ethane | 305.3 | 4.872 |
| Cyclobutane | 460.0 | 4.98 |
| Cyclopentane | 511.7 | 4.51 |
| 1-butene | 419.5 | 4.02 |
| 1-pentene | 464.8 | 3.56 |
| Pentane | 469.7 | 3.37 |
| Benzene | 562.05 | 4.895 |
| 1-hexene | 504.0 | 3.21 |
| Propane | 369.8 | 4.248 |
| Toluene | 591.8 | 4.11 |
| Methane | 190.56 | 4.599 |
| Butane | 425.12 | 3.796 |
| Ethylene | 282.34 | 5.041 |

-continued

| Name | Tc (K) | Pc (MPa) |
|---|---|---|
| Propylene | 364.9 | 4.6 |
| Cyclopentene | 506.5 | 4.8 |
| Isopentane | 460.4 | 3.38 |
| Cyclohexane | 553.8 | 4.08 |
| Heptane | 540.2 | 2.74 |

273.2 K = 0° C.

Pure substances, including all types of hydrocarbons, can exist in either a subcritical, or supercritical state, depending on their temperature and pressure. To be in the supercritical state, a substance must have a temperature above its critical temperature (Tc) and a pressure above its critical pressure (Pc). Mixtures of hydrocarbons, including mixtures of monomers, polymers, and optionally inert solvents, have pseudo-critical temperatures (Tc) and pseudo-critical pressures (Pc), which for many systems can be approximated by mole-fraction-weighted averages of the corresponding critical properties (Tc or Pc) of the mixture's components. Mixtures with a temperature above their pseudo-critical temperature and a pressure above their pseudo-critical pressure will be said to be in a supercritical state or phase, and The following abbreviations are used: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, TMS is trimethylsilyl, TIBA is tri-isobutylaluminum, MAO is methylaluminoxane, pMe is para-methyl, flu is fluorenyl, cp is cyclopentadienyl.

By continuous is meant a system that operates (or is intended to operate) without interruption or cessation. For example, a continuous process to produce a polymer would be one where the reactants are continually introduced into one or more reactors and polymer product is continually withdrawn.

Slurry polymerization refers to a polymerization process in which particulate, solid polymer (e.g., granular) forms in a dense fluid or in a liquid/vapor polymerization medium. The dense fluid polymerization medium can form a single or two fluid phases, such as liquid, supercritical fluid, or liquid/liquid, or supercritical fluid/supercritical fluid, polymerization medium. In a liquid/vapor polymerization medium, the polymer resides in the liquid (dense) phase. Slurry polymerization processes typically employ heterogeneous catalyst particles, such as Ziegler-Natta catalysts or supported metallocene catalysts, and the like. The solid polymeric product typically adheres to the heterogeneous solid catalyst particles thus forming a slurry phase. Slurry polymerization processes operate below the solid-fluid phase transition temperature of the polymerization system.

Solution polymerization refers to a polymerization process in which the polymer is dissolved in a liquid polymerization system, such as an inert solvent or monomer(s) or their blends. Solution polymerization comprises a homogeneous liquid polymerization system in the reactor. The temperature of a liquid polymerization system is below of its supercritical or pseudo supercritical temperature, thus solution polymerizations are performed below the supercritical temperature and/or pressure. Conventional solution polymerization processes typically operate with more than 65 wt % inert solvent present in the polymerization system at pressures below 13 MPa (1885 psi) and temperatures between 40 and 160° C.

Advanced solution polymerization refers to a homogeneous solution polymerization process in which the reactor pressure is between 1.72-34.5 MPa (250-5,000 psi), the reactor temperature is between 50 and 160° C., solvent concentration in the liquid polymerization system is between 20 and 65 weight percent (wt %). The solvent is typically a hydrocarbon or fluorohydrocarbon that is inert in polymerization. Advantageously, the solvent is a paraffinic hydrocarbon of 4-8 carbon atoms.

Supercritical polymerization refers to a polymerization process in which the polymerization system is in its dense supercritical or pseudo supercritical state, i.e. when the density of the polymerization system is above 300 g/L and its temperature and pressure are above the corresponding critical values.

Bulk polymerization refers to a polymerization process in which the dense fluid polymerization system contains less than 40 wt %, or less than 30 wt %, or less than 20 wt %, or less than 10 wt %, or less than 5 wt %, or less than 1 wt % of inert solvent. Inert solvents are characterized by their lack of incorporation into the product polymer chain. In the production of polyolefins, solvents are typically hydrocarbons comprising 4 to 20 carbon atoms, advantageously 5 to 10, or 5 to 8 carbon atoms. Note that the polymerization system may also contain inert diluents that do not incorporate into the product polymer chain. They are typically introduced as impurities present in the monomer feeds. For the purpose of the current disclosure, the inert diluents are considered separately from the inert solvents, the latter of which are added intentionally for their ability to keep the polymeric products in their dissolved state.

Homogeneous supercritical polymerization refers to a polymerization process in which the polymer is dissolved in a dense supercritical fluid polymerization medium, such as an inert solvent or monomer or their blends in their supercritical state. As described above, when the supercritical fluid polymerization system contains less than 40 wt %, or less than 30 wt %, or less than 20 wt %, or less than 10 wt %, or less than 5 wt %, or less than 1 wt % of inert solvent and the polymer is dissolved in the dense supercritical fluid, the process is referred to as a bulk homogeneous supercritical polymerization process. Homogeneous supercritical polymerization should be distinguished from heterogeneous supercritical polymerizations, such as for example, supercritical slurry processes, the latter of which are performed in supercritical fluids but form solid polymer particulates in the polymerization reactor. Similarly, bulk homogeneous supercritical polymerization should be distinguished from bulk solution polymerization, the latter of which is performed in a liquid as opposed to in a supercritical polymerization system.

Exemplary homogeneous polymerization processes are homogeneous supercritical (also referred to herein as supercritical), solution, or advanced solution polymerization processes.

Reaction zone refers to the interior of a polymerization reactor where both the catalyst system and the polymerization system are present and mixed intentionally. The reaction zone is defined as the reactor interior filled with the mixed polymerization and catalyst systems between the feed ports and the effluent ports. By "where both the catalyst system and the polymerization system are present and mixed intentionally" we mean the space where the polymerization reaction is designed to take place and the polymer is designed to be present as opposed to spaces where no reaction is intended to happen and no polymer is intended to be present, such as the interior of the catalyst and monomer feed ports, stirrer assembly, etc. Although the later spaces are directly coupled to the reaction zone, no polymer is intended to enter and no polymer is intended to be polymerized in those spaces.

DETAILED DESCRIPTION

All numerical values within the detailed description and the claims herein are modified by "about" or "approximately"

the indicated value, and take into account experimental error and variations that would be expected by a person having ordinary skill in the art.

Provided are methods of producing polymers with broadened molecular weight and/or composition distribution in a single continuous reactor operating with a homogeneous polymerization system. More particularly, provided are methods of producing polymers with broadened molecular weight and/or composition distribution in a continuous reactor with a homogeneous polymerization system in its reaction zone utilizing reactor temperature gradients, reactor polymer concentration gradients, monomer concentration gradients, catalyst concentration gradients, and combinations thereof. Non-limiting exemplary continuous homogeneous polymerization systems include, supercritical, solution, and advanced solution polymerization conditions. Solution and advanced solution polymerizations performed with liquid-filled reactors, that is, the polymer-containing reaction mixture, i.e., the polymerization system, fills the entire volume of the reactor. Note that supercritical systems always fill the entire volume available to them. Generally in these liquid filled reactor systems, prior-art processes attempt to achieve uniformity of reactor temperature, reactor polymer concentration, monomer composition dispersion, and catalyst composition dispersion, which generally helps to promote less variation in molecular weight and composition distribution.

The present disclosure offers simple, cost-efficient methods for overriding the tendency of metallocene catalysts for producing resins with low MWD and/or low CD, thus to make instead polymers with broadened MWD and/or CD (understood hereinafter as processes of producing polymers with broadened molecular weight and/or broadened composition distribution) in a continuous single reactor operating with a homogeneous polymerization system. The essence of the present disclosure is to create a zone (or multiple zones) in the polymerization reactor that is not fully mixed with the rest of the reactor content. These imperfectly mixed zones create local polymerization conditions, most generally in terms of temperature, monomer and/or catalyst composition, and polymer concentration that are different from zone-to-zone in the reactor. These differences in conditions may then lead to the formation of polymer fractions that have different molecular weight, composition and/or crystallinity. For example, in one embodiment of the present disclosure such an imperfectly mixed zone (or multiple zones) is created by limiting the rate of mixing of the fresh feed entering the reactor with other fractions of the reactor content.

The processes of producing polymers with broadened molecular weight and/or composition distribution in a single continuous reactor operating with a homogeneous polymerization system disclosed herein may operate in conjunction with the advanced solution polymerization processes described in U.S. patent application Ser. No. 11/954,273 filed on Dec. 12, 2007, U.S. patent application Ser. No. 11/961,583 filed on Dec. 20, 2007, and U.S. patent application Ser. No. 12/016,346 filed on Jan. 18, 2008, each of which are herein incorporated by reference in their entirety.

The processes of producing polymers with broadened molecular weight and/or composition distribution in a single continuous reactor operating with a homogeneous polymerization system disclosed herein may operate in conjunction with the solution polymerization processes and apparatus described in U.S. Pat. No. 7,163,989, herein incorporated by reference in its entirety.

The processes of producing polymers with broadened molecular weight and/or composition distribution in a single continuous reactor operating with a homogeneous polymerization system disclosed herein may also operate in conjunction with the supercritical polymerization processes described in U.S. Pat. No. 7,279,536, herein incorporated by reference in its entirety.

The processes of producing polymers with broadened molecular weight and/or composition distribution in a single continuous reactor operating with a homogeneous polymerization system may also operate in conjunction with the in-line blending processes described in U.S. Patent Application No. 60/905,247 filed on Mar. 6, 2007, and U.S. Patent Application No. 60/876,193 filed on Dec. 20, 2006, both of which are herein incorporated by reference in their entirety.

Reactor Temperature Gradient Embodiments

Figure 1:
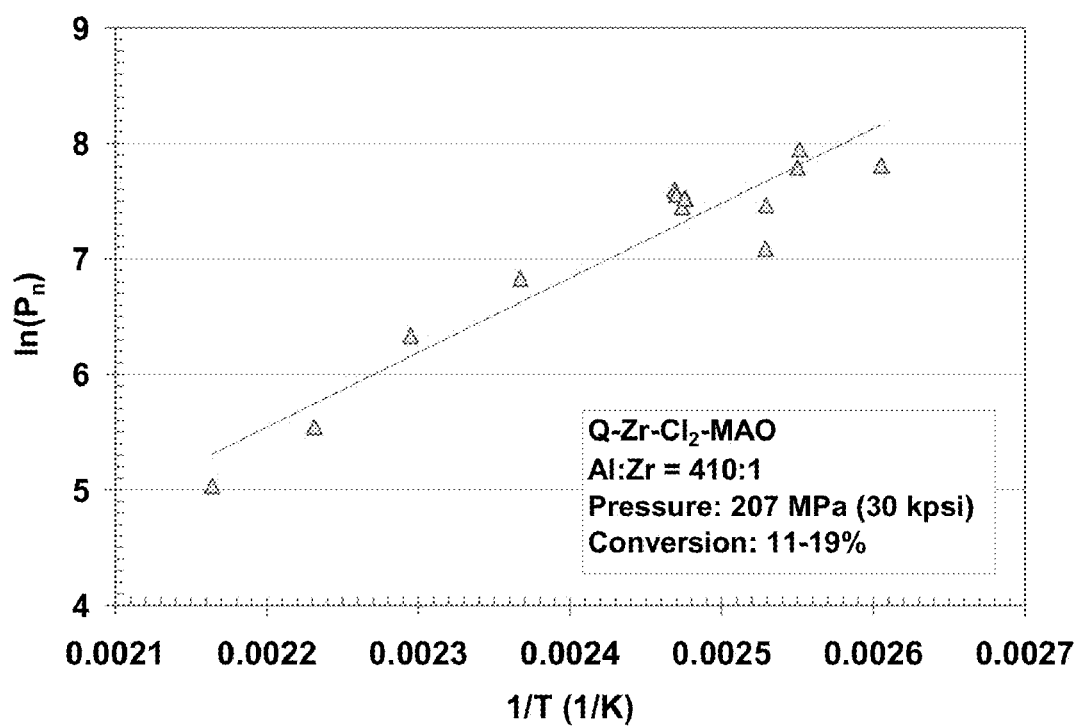
FIG. 1 presents an Arrhenius plot for the degree of polymerization (PO of polypropylene made in supercritical polypropylene using MAO-activated (μ-dimethylsilyl)bis(2-methyl-4-phenylindenyl)zirconium dichloride (Q-Zr-MAO) at 30 kpsi.

The polymerization temperature effect on molecular weight of the resultant polymer may be readily described by plotting the logarithm of the number of monomer units in the polymer ($P_n$) as a function of the reciprocal value of the polymerization temperature in Kelvin. Such plots are often referred to as Arrhenius plots and an example of such a correlation is depicted in FIG. 1. In the case of propylene polymerizations, decreasing polymerization temperature not only increases molecular weight (MW) but also increases polymer crystallinity, as stereo and regio defect populations are generally reduced. So, for polypropylene, the temperature dependence of crystallinity and molecular weight are highly correlated (see FIG. 2).

Figure 2:
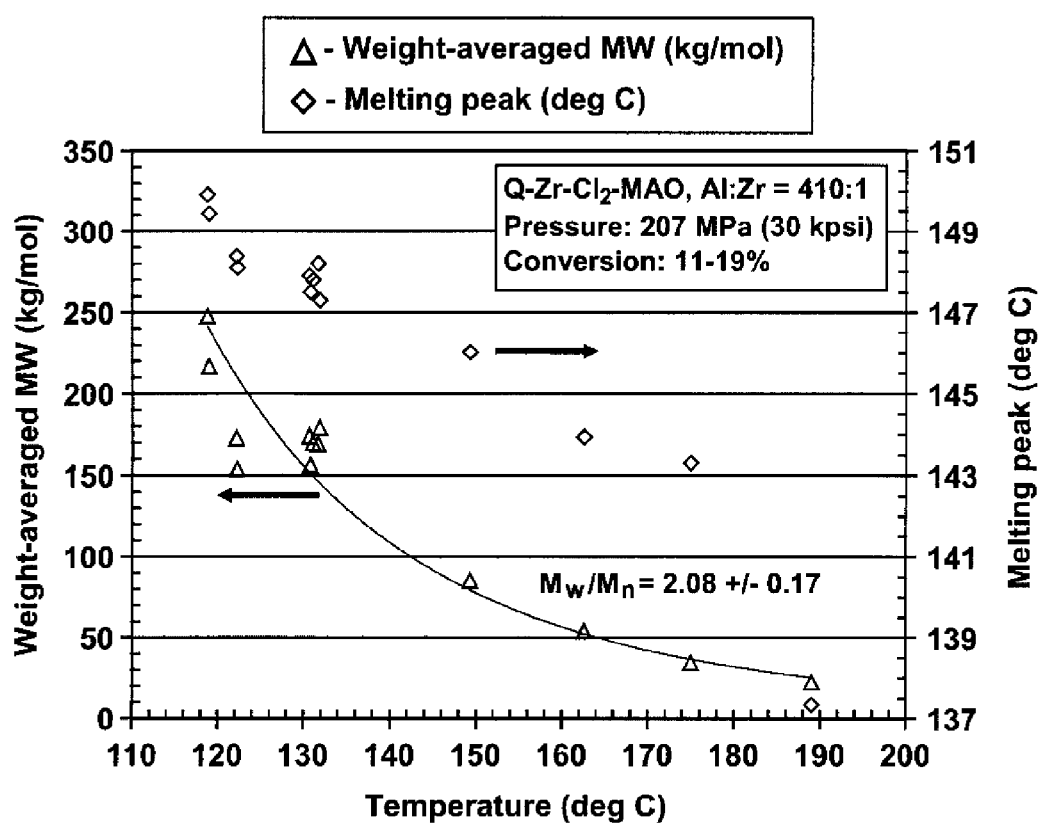
FIG. 2 presents the effect of polymerization temperature on the molecular weight and melting peak temperature of polypropylene made in supercritical polypropylene using MAO-activated (μ-dimethylsilyl)bis(2-methyl-4-phenylindenyl)zirconium dichloride (Q-Zr-MAO) catalyst at 207 MPa (30 kpsi).

One method of the present invention for producing broadened MWD and broadened crystallinity of the resulting polymer may be to create reactor zones that operate at different temperatures at steady state conditions (also referred to as reactor temperature gradients). As illustrated in FIG. 2, the polymer products made in reactor zones operating at different temperatures may have different molecular weights and crystallinities. Consequently, the resultant polymer product at the exit port of the reactor may be composed of a blend of polymer fractions of different average molecular weight, which by definition, broadens the molecular weight distribution (MWD) and composition distribution (CD) of the final polymer product. In one method of the present invention, such reactor zones of different temperatures may be created by having the reactor feed at a temperature that is different from the temperature of the bulk of the reactor (advantageously, the feed temperature is lower than the temperature of the bulk of the reactor) and restricting the mixing of the feed with the bulk of the reactor after the feed enters the reaction zone. The larger the temperature difference between the reactor feed temperature and the bulk reactor temperature, the broader may be the MWD and CD of the final polymer product. Creating such reactor temperature gradients may be achieved by either controlling the temperature of the reactor zones by heat exchangers (for example, by using cooling coils or jackets controlling the temperatures of the reactor zones), and/or by cooling the reactor feed entering the first reactor zone of an essentially adiabatic reactor and letting the reactor temperature rise in downstream zones due to the heat of the reaction. Due to the correlation between MW and crystallinity, polymer products produced using these reactor temperature gradients may also have broadened composition distributions.

Mixing within the reactor may also be limited, and thus the effects of increased feed/reactor bulk temperature differences may be increased by increasing the length/diameter ratio of stirred tank reactors, reducing stirring power of stirred tank reactors, creating limited mixing between reactor zones through the use of internal baffles separating reactors zones so as to restrict convectional flow along the axis of the reactor, and combinations of these techniques.

As mentioned earlier and depicted by FIG. 1, generally higher polymerization temperatures lead to lower molecular weight of the resultant polymer. The lower and upper limits of operating temperatures in the reactor zones are usually determined by the product property targets and process factors, such as catalyst stability, fouling, etc. For example, since often polymers with higher molecular weights and/or higher melting points are desired, high polymerization temperatures ($\geqq 250°$ C.) are generally not advantageous. Increased temperatures can also degrade most known catalytic systems, providing another reason for avoiding excessive polymerization temperatures. The lower limits of reaction temperature are determined also by the desired polymer properties. Lower temperatures generally favor higher crystallinity and higher molecular weight (for an example, see again FIG. 2). For the disclosed homogeneous polymerization processes, the lower limits of reaction temperature are also determined by the solid-fluid phase transition temperature. Running the reactors below the solid-fluid phase transition temperature of the reaction mixture may lead to fouling. For the production of highly crystalline polypropylenes (melting peak temperatures>150° C.) in bulk homogeneous supercritical polymerization processes, the minimum operating temperature is about 95-100° C. In the production of lower melting polymers and copolymers, such as low-crystallinity polypropylene, ethylene-propylene and ethylene-(hexene-1) copolymers, significantly lower reactor temperatures, e.g., 90° C., 80° C., 70° C., 60° C., 50° C. or even lower, may be readily used without fouling. From an economic standpoint, reduced polymerization temperature may not be optimal, since lower reactor temperature increases cooling cost. The application of certain inert solvents may further reduce the minimum operation temperature of the fouling-free operation regime, although, as discussed earlier, the substantial presence of inert solvents also tends to limit the product molecular weight and often the melting peak temperature. It also increases production cost due to the need for solvent handling. At the current state of the art of olefin polymerization with single-site catalysts, polymerization temperatures above 350° C., or above 250° C., or above 200° C., or above 180° C. are not recommended.

In one embodiment of the present disclosure, the disclosed processes for producing polymers with broadened molecular weight distribution in a continuous homogeneous polymerization system are achieved utilizing reactor temperature gradients. More particularly, a tubular, a loop or a stirred tank reactor with one or more feed entry ports may be fed with one or more reactor feed streams including: 1) one or more monomers; 2) one or more catalyst systems; 3) optional one or more scavengers; 4) optional one or more diluents or solvents; and 5) combinations thereof, through the one or more feed entry ports. The one or more monomers may be chosen from ethylene, propylene, butenes, hexenes, octenes, decenes, dodecenes and combinations thereof.

The reactor temperature may be above the solid-fluid phase-transition temperature of the polymerization system and a pressure no lower than 10 MPa, or 1 MPa, or 0.1 MPa, or 0.01 MPa below the cloud point pressure of the polymerization system and less than 1500 MPa, or less than 200 MPa, or less than 100 MPa, or less than 70 MPa, or less than 50 MPa and the polymerization system in the reactor is in its dense fluid state. The polymerization system includes one or more monomers, any diluent or solvent present, any scavenger present, and the polymer product. The one or more catalyst systems include one or more catalyst precursors, one or more catalyst activators, and optionally, one or more catalyst supports. The one or more catalyst precursors are chosen from metallocene catalysts, non-metallocene metal-centered, heteroaryl ligand catalysts, and late transition metal catalysts.

The polymerization system formed in the reactor includes a homogeneous fluid polymer-monomer mixture, with a sufficient temperature gradient to form a polymer product with a broader molecular weight distribution than otherwise would have been produced absent the reactor temperature gradient. The temperature gradient is defined as the temperature in the first reactor zone (for baffled reactors) or at 5% of the reactor length (for reactors without baffles) minus the temperature in the reactor at the reactor exit port. The temperature in the first reactor zone for baffled reactors, or at 5% of the reactor length for reactors without baffles, and at the reactor exit port may be measured by techniques known to those skilled in the art, including, but not limited to, thermocouples protruding into the reactor at specified locations, infrared sensors mounted in the inside wall of the reactor at the specified locations, or a combination of thermocouples and infrared sensors. In one form of this embodiment, the temperature gradient within the reactor is greater than 15° C., or greater than 35° C., or greater than 50° C., or greater than 65° C., or greater than 90° C. The molecular weight distribution as measured by Mw/Mn of the polymer product may be greater than 2.3, or greater than 3.0, or greater than 4.0, or greater than 5.0. Non-limiting exemplary polymer products include polypropylene homopolymers, ethylene-propylene copolymers, propylene-(butene-1) copolymers, or ethylene-propylene-butene-1 terpolymers.

The temperature gradient in the reactor may be produced via cooling one or more of the reactor feed streams prior to entering the reactor and restricting the mixing within the reactor either by baffles, or by reduced stirring power, or by increased (>5, or >10, or >15, or >50, or >100) reactor length/diameter ratios. Alternatively, the temperature gradient in the reactor may be produced via heat exchange within the reactor and/or heat exchange through the reactor walls. In addition, the temperature gradient in the reactor may be produced via a combination of cooling one or more of the reactor feed streams prior to entering the reactor.

Figure 3:
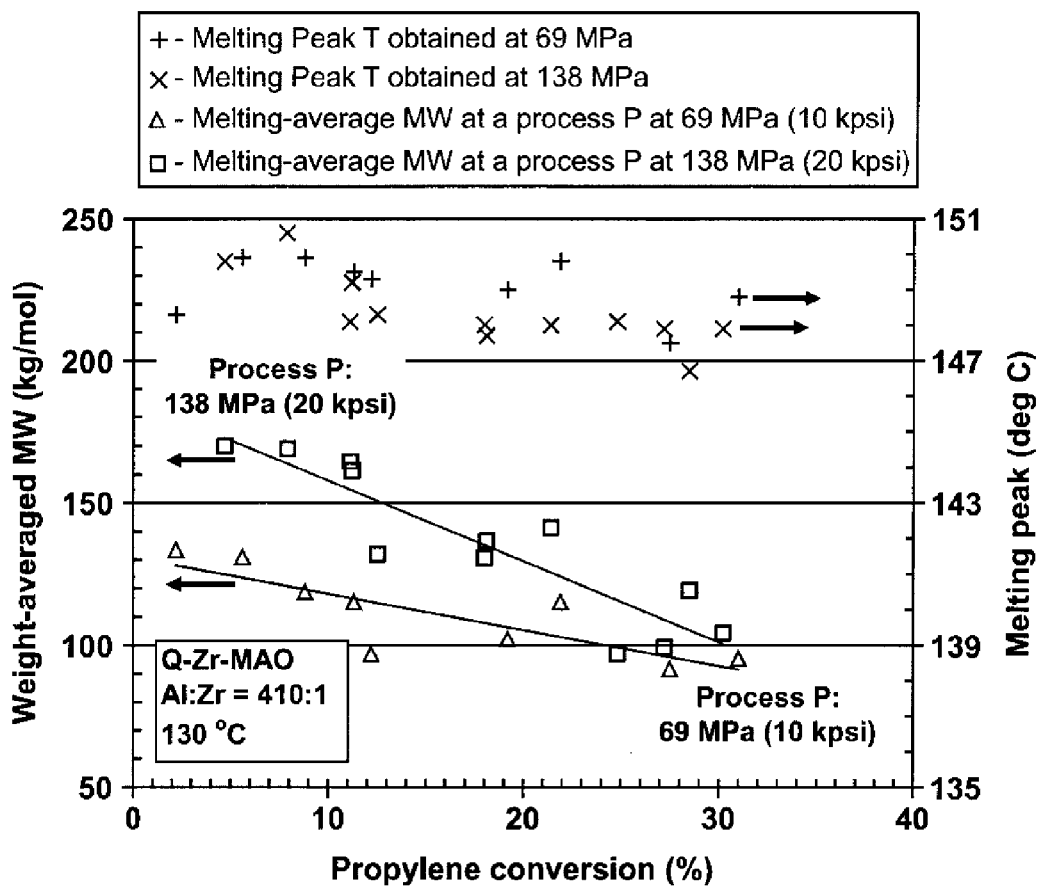
FIG. 3 presents the effect of propylene conversion in the polymerization of supercritical propylene using MAO-activated (μ-dimethylsilyl)bis(2-methyl-4-phenylindenyl)zirconium dichloride (Q-Zr-MAO) at 130° C. and 69 and 138 MPa (10 or 20 kpsi, respectively).

In another form of this reactor temperature gradient embodiment, a combination of temperature and reactor polymer concentration gradients may be created within the reactor to further facilitate the formation of a polymer product with a broader molecular weight distribution (also referred to herein as a combined reactor temperature gradient/reactor polymer concentration gradient embodiment). As shown in FIG. 3, increasing monomer conversion, and thus increasing polymer concentration, correlates with reduced MW. More particularly, the reactor may further include a means for minimizing back-mixing of the polymerization system in the reactor to create a polymer concentration gradient within the reactor of 20 wt % or more. The polymer concentration gradient is defined as the polymer concentration in the reactor effluent minus the polymer concentration in the first reactor zone or at 5% of the reactor length downstream of the feed entry port closest to the reactor head. The polymer concentration gradient in the first reactor zone for baffled reactors, or at 5% of the reactor length downstream of the feed entry port closest to the reactor head for reactors without baffles, and in the reactor effluent may be measured by techniques known to those skilled in the art, including, but not limited to, sampling the reactors contents (via sampling ports) at the specified locations. The polymer concentration can be determined, for example, by first evaporating the monomer and solvent and then weighing the polymer. In some instances the polymer is crystalline and drops out from the polymerization system upon cooling. The solvent and monomer can be then simply decanted or filtered, dried and weighed. The monomer concentration and composition can be determined by, for example, gas chromatography. These and similar techniques are well known in the art of polymerization.

Alternatively, the polymer concentration gradient within the reactor may be 25 wt % or more, or 30 wt % or more, or 35 wt % or more, or 40 wt % or more.

The polymer concentration gradient within the reactor may be formed by a suitable means for minimizing back-mixing of polymer reactor content. One means for minimizing back-mixing of polymer reactor content includes baffles angled to the overall flow direction of the dense fluid polymerization system within the reactor (for example, but not limited to, perpendicular baffles or any conical collar-shaped baffle that creates reactor zones with restricted mixing between the zones). Another means for minimizing back-mixing of polymer reactor content includes increased length/diameter to reduce mixing along the reactor axis. In such embodiments, the length/diameter of the reactor advantageously is greater than 5, or greater than 10, or greater than 15, or greater than 50, or greater than 100. Yet another means for minimizing back-mixing of the reaction zone includes a combination of baffles angled with respect to the overall flow direction of the dense fluid polymerization system within the reactor and a length/diameter of the reactor of greater than 5, or greater than 10, or greater than 15, or greater than 50, or greater than 100.

This combined reactor temperature gradient/reactor polymer concentration gradient embodiment may also produce polymer products with a molecular weight distribution as measured by Mw/Mn of greater than 2.3, or greater than 3.0, or greater than 4.0, or greater than 5.0.

In another form of this reactor temperature gradient embodiment, a monomer concentration gradient may also be created within the reactor to further facilitate the formation of a polymer product with a broader molecular weight and/or composition distribution (also referred to herein as a combined reactor temperature gradient/monomer concentration gradient embodiment). One way of generating monomer concentration gradient is to allow a large enough conversion without monomer make up and restrict the mixing of the polymerization system in the reaction zone by means described above. Another way to produce a monomer concentration gradient in combination with a temperature gradient, is that at least one of the monomers may be fed to the reactor at an upstream feed entry port and at least one other of the monomers may be fed to the reactor at one or more downstream feed entry ports. More particularly, the total number of monomers fed to the reactor through the upstream feed entry port may be less than the total number of monomers fed to the reactor through the upstream feed entry port and the one or more downstream feed entry ports. In addition, the concentration of at least one monomer in the polymerization system in the first reactor zone in a baffled reactor or at 5% downstream of the reactor length from the upstream feed entry port of a baffle-free reactor may be at least 5%, or at least 10%, or at least 30%, or at least 40%, or at least 50%, or at least 60%, or at least 70%, or at least 80%, or at least 90% different from the concentration of the same at least one monomer in the polymerization system at the one or more downstream feed entry ports or at the exit port of the reactor. The monomer concentration gradient in the first reactor zone for baffled reactors, or at 5% of the reactor length from the upstream feed entry port of a baffle-free reactor, and at the one or more downstream feed entry ports and at the exit port of the reactor may be measured by techniques known to those skilled in the art, including, but not limited to, sampling the reactors contents (via sampling ports) at the specified locations and then determining the monomer concentration before or after separating the polymeric product by, for example, gas chromatography. This combination of reactor configuration and reactor conditions may be utilized to obtain a monomer concentration gradient within the reactor while also facilitating the formation of a copolymer product with a broader molecular weight distribution via the generation of a temperature gradient.

This combined reactor temperature gradient/monomer concentration gradient embodiment may also produce polymer products with a molecular weight distribution as measured by Mw/Mn of greater than 2.3, or greater than 3.0, or greater than 4.0, or greater than 5.0.

In yet another form of this combined reactor temperature gradient/monomer concentration gradient embodiment, a catalyst composition dispersion may also be created within the reactor to further facilitate the formation of a polymer product with a broader molecular weight distribution (also referred to herein as a combined reactor temperature gradient/monomer concentration gradient/catalyst composition dispersion embodiment). This embodiment combines the potential differences in the product molecular weights and compositions obtained with different catalysts at otherwise identical conditions with the effect of temperature and monomer concentration gradients. By product composition, we mean the concentration of comonomers in copolymers or the concentration of stereoregular (isotactic or syndiotactic) monomers in the polymer chains. To produce a catalyst composition dispersion, at least one of the catalyst systems may be fed to the reactor at an upstream feed entry port of the reactor and at least one of the catalyst systems may be fed to the reactor at one or more downstream feed entry ports of the reactor. In addition, the total number of catalyst precursors or catalyst activators of the catalyst system in the reactor at the upstream feed entry port may be less than the total number of catalyst precursors or catalyst activators of the catalyst system in the reactor at the one or more downstream feed entry ports, and the concentration of at least one catalyst precursor or one catalyst activator component of the catalyst system in the first reactor zone in a baffled reactor or at 5% downstream of the reactor length in a baffle-free reactor from the upstream feed entry port should be at least 5% different from the concentration of the same at least one catalyst precursor or one catalyst activator component of the catalyst system at the one or more downstream feed entry ports. The catalyst composition dispersion in the first reactor zone for baffled reactors, or at 5% of the reactor length from the upstream feed entry port of a baffle-free reactor, and at the one or more downstream feed entry ports, may be measured by techniques known to those skilled in the art, including, but not limited to, sampling the reactors contents (via a sampling port) at the specified location and then determining the concentration of at least one catalyst precursor or one catalyst activator component of the catalyst system by nuclear magnetic resonance (NMR) analysis, or by UV-visible spectroscopy, etc. Spectroscopic analyses can also be performed in situ by means of internal circulation loops or by optical probes, known in the art of analytical chemistry. It should be noted that catalyst concentration gradients are typically controlled by controlled metering of the catalyst feed solution of known concentration to the reactor at specified feed ports.

This combination of reactor configuration and reactor conditions may be utilized to obtain catalyst composition dispersion within the reactor to facilitate the formation of a polymer product with a broader molecular weight and/or composition distribution.

Alternatively, in forming the catalyst composition dispersion within the reactor, the concentration of at least one catalyst precursor or one catalyst activator component of the catalyst system in the first reactor zone of a baffled reactor or at 5% downstream of the reactor length from the upstream feed entry port of a baffle-free reactor may be at least 10%, or at least 20%, or at least 30%, or at least 40%, or at least 50%, or at least 60%, or at least 70%, or at least 80%, or at least 90% different from the concentration of the same at least one catalyst precursor or one catalyst activator component of the catalyst system at the one or more downstream feed entry ports.

This combined reactor temperature gradient/monomer concentration gradient/catalyst composition dispersion embodiment may also produce polymer products with a molecular weight distribution as measured by Mw/Mn of greater than 2.3, or greater than 3.0, or greater than 4.0, or greater than 5.0.

In still yet another form of this reactor temperature gradient embodiment, a catalyst composition dispersion may also be created within the reactor to further facilitate the formation of a polymer product with a broader molecular weight and/or composition distribution (also referred to herein as a combined reactor temperature gradient/catalyst composition dispersion embodiment). This embodiment combines the potential differences in the product molecular weights and compositions obtained with different catalysts at otherwise identical conditions with the effect of temperature dispersion. By product composition, we mean the concentration of comonomers in copolymers or the concentration of stereo-regular (isotactic or syndiotactic) monomers in the polymer chains. To produce catalyst composition dispersion, at least one of the catalyst systems may be fed to the reactor at an upstream feed entry port of the reactor and at least one of the catalyst systems may be fed to the reactor at one or more downstream feed entry ports of the reactor. In addition the total number of catalyst precursors or catalyst activators of the catalyst system in the reactor at the upstream feed entry port should be less than the total number of catalyst precursors or catalyst activators of the catalyst system in the reactor at the one or more downstream feed entry ports, and the concentration of at least one catalyst precursor or one catalyst activator component of the catalyst system in the first reactor zone in a baffled reactor or at 5% downstream of the reactor length from the upstream feed entry port of a baffle-free reactor should be at least 5%, or at least 10%, or at least 20%, or at least 30%, or at least 40%, or at least 50%, or at least 60%, or at least 70%, or at least 80%, or at least 90% different from the concentration of the same at least one catalyst precursor or one catalyst activator component of the catalyst system at the one or more downstream feed entry ports. This combination of reactor configuration and reactor conditions may be utilized to obtain a catalyst composition dispersion within the reactor to facilitate the formation of a polymer product with a broader molecular weight and/or composition distribution.

This combined reactor temperature gradient/catalyst composition dispersion embodiment may also produce polymer products with a molecular weight distribution as measured by Mw/Mn of greater than 2.3, or greater than 3.0, or greater than 4.0, or greater than 5.0.

In still yet another form of this reactor temperature gradient/catalyst composition dispersion embodiment, a monomer concentration gradient, and a reactor polymer concentration gradient may also be created within the polymerization system using the methods described above. That is the formation of a polymer product with a broader molecular weight and/or composition distribution may also be achieved through a combination of a reactor temperature gradient, a monomer concentration gradient, and a catalyst composition dispersion using the methods described above. In addition, the formation of a polymer product with a broader molecular weight and/or composition distribution may also be achieved through a combination of a reactor temperature gradient, a reactor polymer concentration gradient, and a catalyst composition dispersion using the methods described above. Moreover, the formation of a polymer product with a broader molecular weight and composition distribution may also be achieved through a combination of a reactor temperature gradient, a monomer concentration gradient, a reactor polymer concentration gradient and a catalyst composition dispersion using the methods described above.

Reactor Polymer Concentration Gradient Embodiments

In another embodiment of the present disclosure, the disclosed processes utilize a polymer concentration gradient in a single continuous reactor with a homogeneous polymerization system for producing polymers with broadened molecular weight distribution. More particularly, a tubular, a loop or a stirred tank reactor with one or more feed entry ports may be fed with one or more reactor feed streams including: 1) one or more monomers; 2) one or more catalyst systems; 3) optional one or more scavengers; 4) optional one or more diluents or solvents; and 5) combinations thereof, through the one or more feed entry ports. The one or more monomers may be chosen from ethylene, propylene, butenes, hexenes, octenes, decenes, dodecenes and combinations thereof.

The reactor temperature may be above the solid-fluid phase-transition temperature of the polymerization system and a pressure no lower than 10 MPa, or 1 MPa, or 0.1 MPa, or 0.01 MPa below the cloud point pressure of the polymerization system and less than 1500 MPa, or less than 200 MPa, or less than 100 MPa, or less than 70 MPa, or less than 50 MPa and the polymerization system in the reactor is in its dense fluid state. The polymerization system includes one or more monomers, any diluent or solvent present, any scavenger present, and the polymer product. The one or more catalyst systems include one or more catalyst precursors, one or more catalyst activators, and optionally, one or more catalyst supports. The one or more catalyst precursors are chosen from metallocene catalysts, non-metallocene metal-centered, heteroaryl ligand catalysts, and late transition metal catalysts.

The polymerization system formed in the reactor includes a homogeneous fluid phase polymer-monomer mixture, with a sufficient polymer concentration gradient to form a polymer product with a broader molecular weight distribution than otherwise would have been produced absent the reactor polymer concentration gradient. The polymer concentration gradient is defined as the polymer concentration in the reactor effluent minus the polymer concentration in the first reactor zone in a baffled reactor or at 5% of the reactor length downstream of the feed entry port closest to the reactor head in a baffle-free reactor. The polymer concentration gradient in the first reactor zone for baffled reactors, or at 5% of the reactor length downstream of the feed entry port closest to the reactor head for reactors without baffles, and in the reactor effluent may be measured by techniques known to those skilled in the art, including, but not limited to, sampling the reactors contents (via a sampling port) at the specified location and then determining the polymer weight of the sample after evaporating the monomer and solvent to determine the polymer concentration gravimetrically. The molecular weight distribution as measured by Mw/Mn of the polymer product may be greater than 2.3, or greater than 3.0, or greater than 4.0, or greater than 5.0. Non-limiting exemplary polymer products include polypropylene homopolymer, an ethylene-propylene copolymer, a propylene-(butene-1) copolymer, or an ethylene-propylene-(butene-1) terpolymer.

The polymer concentration gradient may be formed in the reactor by a means for minimizing back-mixing of the polymerization system to create a polymer concentration gradient of 20 wt % or more, or 25 wt % or more, or 30 wt % or more, or 35 wt % or more, or 40 wt % or more to form a broadened molecular weight distribution as described above. The means for minimizing back-mixing of polymer reactor content may include baffles angled with respect to the overall flow direction of the dense fluid polymerization system within the reactor. Another means for controlling the back-mixing of the polymer reactor content may include a length/diameter (L/D) of the reactor of greater than 5, or greater than 10, or greater than 15, or greater than 50, or greater than 100. Yet another means for minimizing back-mixing of polymer reactor content may include both baffles angled with respect to the overall flow direction of the dense fluid polymerization system within the reactor and an L/D of the reactor of greater than 5, or greater than 10, or greater than 15, or greater than 50, or greater than 100.

In another form of this reactor polymer concentration gradient embodiment, a monomer concentration gradient may also be created within the reactor to further facilitate the formation of a polymer product with a broader molecular weight and/or composition distribution (also referred to herein as a combined reactor polymer concentration gradient/monomer concentration gradient embodiment). One way of generating monomer concentration gradient is to allow a large enough conversion without monomer make up and restrict the mixing of the polymerization system in the reaction zone by means described above. Another way to produce a monomer concentration gradient in combination with a temperature gradient is that at least one of the monomers may be fed to the reactor at an upstream feed entry port and at least one other of the monomers may be fed to the reactor at one or more downstream feed entry ports. More particularly, the total number of monomers fed to the reactor through the upstream feed entry port may be less than the total number of monomers fed to the reactor through the upstream feed entry port and the one or more downstream feed entry ports. In addition, the concentration of at least one monomer in the polymerization system in the first reactor zone of a baffled reactor or at 5% downstream of the reactor length from the upstream feed entry port of a baffle-free reactor may be at least 5%, or 10%, or 20%, or 30%, or 40%, or 50%, or 60%, or 70%, or 80%, or 90% different from the concentration of the same at least one monomer in the polymerization system at the one or more downstream feed entry ports. This combination of reactor configuration and reactor conditions may be utilized to obtain a monomer concentration gradient within the reactor to facilitate the formation of a polymer product with a broader molecular weight and/or composition distribution.

Monomer Concentration Gradient Embodiments

The effect of monomer conversion on the molecular weight of the resultant polymer for a propylene monomer in a homogeneous supercritical polymerization process is depicted in FIG. 3. FIG. 3 shows that increasing conversion reduces the polymer molecular weight. Therefore, monomer conversion may be constrained by the desire to increase the molecular weight of the polymer made in a given reactor. Exemplary, but not limiting, total monomer single pass conversions are below 90%, more particularly below 80% and still more particularly below 60%. Total monomer conversion is defined as the weight of polymer made in a reactor divided by the combined weight of monomers in the feed to the reactor. It should be understood that while high total monomer conversion is often limited by product viscosity or by product property targets, the conversion of some highly reactive monomer components present in some monomer feed blends may be higher than 90%. For example, the single-pass conversion of ethylene in ethylene-propylene or in ethylene-higher olefin feed blends may be nearly complete (approaching 100%) and is disclosed herein.

In another embodiment of the present disclosure, the disclosed processes utilize monomer concentration gradients for producing polymers with broadened molecular weight and/or composition distribution in a continuous reactor with a homogeneous polymerization system. More particularly, a tubular, a loop or a stirred tank reactor with one or more feed entry ports may be fed with one or more reactor feed streams including: 1) one or more monomers; 2) one or more catalyst systems; 3) optional one or more scavengers; 4) optional one or more diluents or solvents; and 5) combinations thereof, through the one or more feed entry ports. The one or more monomers may be chosen from ethylene, propylene, butenes, hexenes, octenes, decenes, dodecenes and combinations thereof.

The reactor temperature may be above the solid-fluid phase-transition temperature of the polymerization system and a pressure no lower than 10 MPa, or 1 MPa, or 0.1 MPa, or 0.01 MPa below the cloud point pressure of the polymerization system and less than 1500 MPa, or less than 200 MPa, or less than 100 MPa, or less than 70 MPa, or less than 50 MPa and also the polymerization system in the reactor is in its dense fluid state. The polymerization system includes one or more monomers, any diluent or solvent present, any scavenger present, and the polymer product. The one or more catalyst systems include one or more catalyst precursors, one or more catalyst activators, and optionally, one or more catalyst supports. The one or more catalyst precursors are chosen from metallocene catalysts, non-metallocene metal-centered, heteroaryl ligand catalysts, and late transition metal catalysts.

The polymerization system formed in the reactor includes a homogeneous fluid phase polymer-monomer mixture, with a sufficient monomer concentration gradient to form a polymer product with a broader molecular weight distribution than otherwise would have been produced absent the monomer concentration gradient. The molecular weight distribution as measured by Mw/Mn of the polymer product may be greater than 2.3, or greater than 3.0, or greater than 4.0, or greater than 5.0. Non-limiting exemplary polymer products include polypropylene homopolymer, an ethylene-propylene copolymer, a propylene-butene-1 copolymer, or an ethylene-propylene-butene-1 terpolymer.

In one of the embodiments of the disclosed processes, at least one of the monomers may be fed to the reactor at an upstream feed entry port and at least one of the monomers may be fed to the reactor at one or more downstream feed entry ports to produce a monomer concentration gradient. More particularly, the total number of monomers fed to the reactor through the upstream feed entry port may be less than the total number of monomers fed to the reactor through the upstream feed entry port and the one or more downstream feed entry ports. In addition, the concentration of at least one monomer in the polymerization system in the first reactor zone in a baffled reactor or at 5% downstream of the reactor length from the upstream feed entry port of a baffle-free reactor may be at least 5%, or at least 10%, or at least 20%, or at least 30%, or at least 40%, or at least 50%, or at least 60%, or at least 70%, or at least 80%, or at least 90% different from the concentration of the same at least one monomer in the polymerization system at the one or more downstream feed entry ports or at the exit port. The monomer concentration gradient in the first reactor zone for baffled reactors, or at 5% of the reactor length from the upstream feed entry port of a baffle-free reactor, and at the one or more downstream feed entry ports and at the exit port of the reactor may be measured by techniques known to those skilled in the art, including, but not limited to, sampling the reactors contents (via a sampling port) at the specified location and then determining the monomer composition and concentration by, for example, gas chromatography. This combination of reactor configuration and reactor conditions may be utilized to obtain a monomer concentration gradient within the reactor to facilitate the formation of a polymer product with a broader molecular weight and/or composition distribution.

In yet another form of this monomer concentration gradient embodiment, catalyst composition dispersion may also be created within the reactor to further facilitate the formation of a polymer product with a broader molecular weight and/or composition distribution (also referred to herein as a combined monomer concentration gradient/catalyst composition dispersion embodiment). To produce a catalyst composition dispersion, at least one of the catalyst systems may be fed to the reactor at an upstream feed entry port of the reactor and at least one of the catalyst systems may be fed to the reactor at one or more downstream feed entry ports of the reactor. In addition the total number of catalyst precursors or catalyst activators of the catalyst system in the reactor at the upstream feed entry port should be less than the total number of catalyst precursors or catalyst activators of the catalyst system in the reactor at the one or more downstream feed entry ports, and the concentration of at least one catalyst precursor or one catalyst activator component of the catalyst system in the first reactor zone of a baffled reactor or at 5% downstream of the reactor length from the upstream feed entry port of a baffle-free reactor should be at least 5%, or at least 10%, or at least 20%, or at least 30%, or at least 40%, or at least 50%, or at least 60%, or at least 70%, or at least 80%, or at least 90% different from the concentration of the same at least one catalyst precursor or one catalyst activator component of the catalyst system at the one or more downstream feed entry ports. This combination of reactor configuration and reactor conditions may be utilized to obtain a combination of monomer and catalyst concentration gradients within the reactor to facilitate the formation of a polymer product with a broader molecular weight and/or composition distribution.

This combined monomer composition dispersion gradient/catalyst composition dispersion embodiment may also produce polymer products with a molecular weight distribution as measured by Mw/Mn of greater than 2.3, or greater than 3.0, or greater than 4.0, or greater than 5.0.

In yet another form of this monomer concentration gradient embodiment, a reactor polymer concentration gradient may also be created within the reactor to further facilitate the formation of a polymer product with a broader molecular weight distribution (also referred to herein as a combined monomer concentration gradient/reactor polymer concentration gradient embodiment). More particularly, the reactor may further include a means for minimizing back-mixing of the polymerization system in the reactor to create a polymer concentration gradient within the reactor of 20 wt % or more, or 25 wt % or more, or 30 wt % or more, or 35 wt % or more, or 40 wt % or more. The polymer concentration gradient is defined as the polymer concentration in the reactor effluent minus the polymer concentration in the first reactor zone of a baffled reactor or at 5% of the reactor length downstream of the feed entry port closest to the reactor head of a baffle-free reactor.

The polymer concentration gradient within the reactor may be formed by a suitable means for minimizing back-mixing of polymer reactor content. One means for minimizing back-mixing of polymer reactor content includes baffles angled (for example, perpendicular) with respect to the overall flow direction of the dense fluid polymerization system within the reactor. Another means for minimizing back-mixing of polymer reactor content includes a length/diameter of the reactor of greater than 5, or greater than 10, or greater than 15, or greater than 50, or greater than 100. Yet another means for minimizing back-mixing of polymer reactor content includes a combination of baffles angled with respect to the overall flow direction of the dense fluid polymerization system within the reactor and a length/diameter of the reactor of greater than 5, or greater than 10, or greater than 15, or greater than 50, or greater than 100.

This combined monomer concentration gradient/reactor polymer concentration gradient embodiment may also produce polymer products with a molecular weight distribution as measured by Mw/Mn of greater than 2.3, or greater than 3.0, or greater than 4.0, or greater than 5.0.

Catalyst Composition Dispersion Embodiments

In another embodiment of the present disclosure, the processes utilize catalyst composition dispersion for producing polymers with broadened molecular weight and/or composition distribution in a continuous single reactor operating with a homogeneous polymerization system. This embodiment utilizes the potential differences in the product molecular weights and compositions obtained with different catalysts at otherwise identical conditions. By product composition, we mean the concentration of comonomers in copolymers or the concentration of stereoregular (isotactic or syndiotactic) monomers in the polymer chains. More particularly, a tubular, a loop or a stirred tank reactor with one or more feed entry ports may be fed with one or more reactor feed streams including: 1) one or more monomers; 2) one or more catalyst systems; 3) optional one or more scavengers, 4) optional one or more diluents or solvents; and 5) combinations thereof, through the one or more feed entry ports. The one or more monomers may be chosen from ethylene, propylene, butenes, hexenes, octenes, decenes, dodecenes and combinations thereof.

The reactor temperature may be above the solid-fluid phase-transition temperature of the polymerization system and a pressure no lower than 10 MPa, or 1 MPa, or 0.1 MPa, or 0.01 MPa below the cloud point pressure of the polymerization system and less than 1500 MPa, or less than 200 MPa, or less than 100 MPa, or less than 70 MPa, or less than 50 MPa and the polymerization system in the reactor is in its dense fluid state. The polymerization system includes one or more monomers, any diluent or solvent present, any scavenger present, and the polymer product. The one or more catalyst systems include one or more catalyst precursors, one or more catalyst activators, and optionally, one or more catalyst supports. The one or more catalyst precursors are chosen from metallocene catalysts, non-metallocene metal-centered, heteroaryl ligand catalysts, and late transition metal catalysts.

The combined polymerization and catalyst systems formed in the reactor includes a homogeneous fluid phase polymer-monomer mixture, with a sufficient catalyst composition dispersion to form a polymer product with a broader molecular weight distribution than otherwise would have been produced absent the catalyst composition dispersion. The molecular weight distribution as measured by Mw/Mn of the polymer product may be greater than 2.3, or greater than 3.0, or greater than 4.0, or greater than 5.0. Non-limiting exemplary polymer products include polypropylene homopolymer, an ethylene-propylene copolymer, a propylene-butene-1 copolymer, or an ethylene-propylene-butene-1 terpolymer.

To produce catalyst composition dispersion, at least one of the catalyst systems may be fed to the reactor at an upstream feed entry port of the reactor and at least one of the catalyst systems may be fed to the reactor at one or more downstream feed entry ports of the reactor. In addition the total number of catalyst precursors or catalyst activators of the catalyst system in the reactor at the upstream feed entry port should be less than the total number of catalyst precursors or catalyst activators of the catalyst system in the reactor at the one or more downstream feed entry ports, and the concentration of at least one catalyst precursor or one catalyst activator component of the catalyst system at 5% downstream of the reactor length from the upstream feed entry port should be at least 5%, or at least 10%, or at least 20%, or at least 30%, or at least 40%, or at least 50%, or at least 60%, or at least 70%, or at least 80%, or at least 90% different from the concentration of the same at least one catalyst precursor or one catalyst activator component of the catalyst system at the one or more downstream feed entry ports. The catalyst composition dispersion in the first reactor zone for baffled reactors, or at 5% of the reactor length from the upstream feed entry port of a baffle-free reactor, and at the one or more downstream feed entry ports may be measured by techniques known to those skilled in the art, including, but not limited to, sampling the reactors contents (via a sampling port) at the specified location and then determining the concentration of at least one catalyst precursor or one catalyst activator component of the catalyst system by, for example, NMR or UV-visible, or other spectroscopic methods known in the art of analytical chemistry. This combination of reactor configuration and reactor conditions may be utilized to obtain a catalyst composition dispersion within the reactor to facilitate the formation of a polymer product with a broader molecular weight distribution.

In another form of this catalyst composition dispersion embodiment, a reactor polymer concentration gradient may also be created within the reactor to further facilitate the formation of a polymer product with a broader molecular weight distribution (also referred to herein as a combined catalyst composition dispersion/reactor polymer concentration gradient embodiment). More particularly, the reactor may further include a means for minimizing back-mixing of the polymerization system in the reactor to create a polymer concentration gradient within the reactor of 20 wt % or more, or 25 wt % or more, or 30 wt % or more, or 35 wt % or more, or 40 wt % or more. The polymer concentration gradient is defined as the polymer concentration in the reactor effluent minus the polymer concentration in the first zone of a baffled reactor or at 5% of the reactor length downstream of the feed entry port closest to the reactor head of a baffle-free reactor.

The polymer concentration gradient within the reactor may be formed by a suitable means for minimizing back-mixing of polymer reactor content. One means for minimizing back-mixing of polymer reactor content includes baffles angled with respect to the overall flow direction of the dense fluid polymerization system within the reactor. Another means for minimizing back-mixing of polymer reactor content includes a length/diameter of the reactor of greater than 5, or greater than 10, or greater than 15, or greater than 50, or greater than 100. Yet another means for minimizing back-mixing of polymer reactor content includes a combination of baffles angled with respect to the overall flow direction of the dense fluid polymerization system within the reactor and a length/diameter of the reactor of greater than 5, or greater than 10, or greater than 15, or greater than 50, or greater than 100.

This combined catalyst composition dispersion/reactor polymer concentration gradient embodiment may also produce polymer products with a molecular weight distribution as measured by Mw/Mn of greater than 2.3, or greater than 3.0, or greater than 4.0, or greater than 5.0.

Reactor Design

Any type of polymerization reactor operating in a continuous (continuous feed and continuous product removal) or quasi-continuous (intermittent feed and/or intermittent product removal) mode may be deployed in the process for producing polymers with broadened molecular weight distribution disclosed herein. The optimal reactor design may be determined by standard engineering techniques known to those skilled in the art of chemical engineering. Non-limiting exemplary reactor designs include autoclave reactors (also referred to as a stirred tank), stirred tank with or without an external loop, tubular reactor, and loop reactor. An autoclave or stirred tank reactor that operates in a continuous mode is also referred to in the art of chemical engineering as continuous stirred tank reactor or CSTR. The reactors may operate adiabatically or may be cooled. The cooling may be achieved within the reactor, or through a reactor jacket, or dedicated external heat exchange loops may be applied. The reactors of the polymerization system may be mechanically stirred or unstirred. When more than one reactor is utilized, a combination of autoclave, tank, loop and tubular reactors is also possible. In some embodiments, the reactor may have multiple feed injection ports for monomer(s) and/or catalyst(s) to create monomer concentration gradients and/or catalyst composition dispersion.

Figure 4:
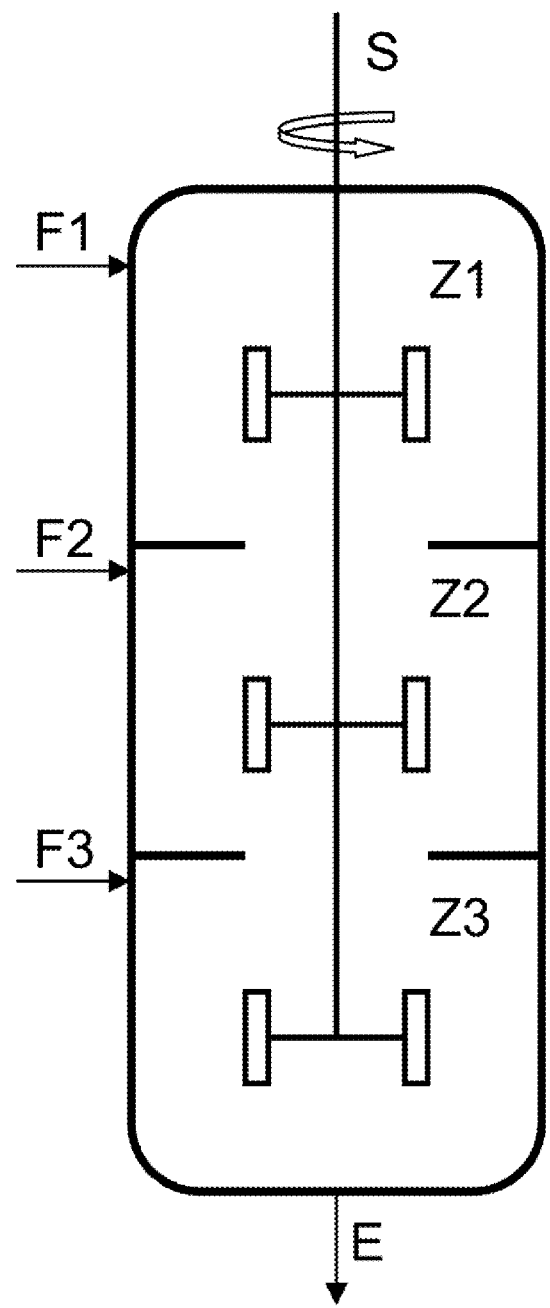
FIG. 4 depicts an exemplary schematic of a stirred tank reactor with baffled zones and multiple injection ports to create gradients of temperature and/or concentration of monomer and/or polymer.

FIG. 4 depicts an exemplary schematic of a stirred tank reactor with baffled zones and multiple injection ports. Referring to FIG. 4, a stirred tank reactor with a stirring mechanism S including multiple impellers is separated into three reactor zones Z1, Z2, and Z3 via a series of internal baffles angled (for example, perpendicular) with respect to the polymerization system flow in the reactor. The reactor effluent E exits from the bottom of the stirred tank reactor. Multiple feed injection ports, designated F1, F2, F3, may be optionally used to create monomer concentration gradients and/or catalyst composition dispersion.

In some embodiments of the present disclosure, the multiple feed injection ports, designated F1, F2, F3 in FIG. 4 may be used to create a monomer concentration gradient through the reactor by feeding at least one of the monomers to the reactor at an upstream feed entry port F1 and feeding at least one of the monomers to the reactor at one or more downstream feed entry ports F2, F3, wherein the total number of monomers fed to the reactor through the upstream feed entry port F1 is less than the total number of monomers fed to the reactor through the upstream feed entry port F1 and the one or more downstream feed entry ports F2, F3; and wherein the concentration of at least one monomer in the polymerization system at 5% downstream of the reactor length from the upstream feed entry port F1 is at least 5%, or 10%, or 15%, or 20%, or 25%, or 30%, or 40%, or 50%, or 60%, or 70%, or 80%, or 90% different from the concentration of the same at least one monomer in the polymerization system at the one or more downstream feed entry ports F2, F3. This monomer concentration gradient approach in the reactor may be used to produce a polymer product with a broader molecular weight distribution than would be produced without the reactor monomer concentration gradient. More particularly, the broader molecular weight as measured by Mw/Mn may be greater than 2.3, or 2.5, or 3.0, or 3.5, or 4.0, or 4.5, or 5.0.

Alternatively, the multiple feed injection ports, designated F1, F2, F3 in FIG. 4, may be used to create a catalyst composition dispersion through the reactor by feeding to the reactor at least one catalyst system at an upstream feed entry port F1 of the reactor and feeding at least one other catalyst system to the reactor at one or more downstream feed entry ports F2, F3 of the reactor, wherein the total number of catalyst precursors or catalyst activators comprising the catalyst system in the reactor at the upstream feed entry port F1 is less than the total number of catalyst precursors or catalyst activators of the catalyst system in the reactor at the one or more downstream feed entry ports F2, F3; and wherein the concentration of at least one catalyst precursor or one catalyst activator component of the catalyst system in the first reactor zone or at 5% downstream of the reactor length from the upstream feed entry port F1 is at least 5%, or 10%, or 15%, or 20%, or 25%, or 30%, or 40%, or 50%, or 60%, or 70%, or 80%, or 90% different from the concentration of the same at least one catalyst precursor or one catalyst activator component of the catalyst system in reactor zones Z2 and Z3. This catalyst composition dispersion approach in the reactor may be used to produce a polymer product with a broader molecular weight distribution than would be produced without the reactor catalyst composition dispersion. More particularly, the broader molecular weight as measured by Mw/Mn may be greater than 2.3, or 2.5, or 3.0, or 3.5, or 4.0, or 4.5, or 5.0.

Again referring to FIG. 4, the baffles angled (for example, perpendicular, or conical collar) with respect to the flow direction of the dense fluid polymerization system within the reactor to create reactor zones Z1, Z2 and Z3 may be used to create a polymer concentration gradient of 20 wt % or more, or wt % or more, or 30 wt % or more, or 35 wt % or more, or 40 wt % or more through controlled back mixing of the polymerization system. The polymer concentration gradient approach may be used to produce a polymer product with a broader molecular weight distribution than would be produced without the polymer concentration gradient. More particularly, the broader molecular weight as measured by Mw/Mn may be greater than 2.3, or 2.5, or 3.0, or 3.5, or 4.0, or 4.5, or 5.0.

Alternatively, any combination of a reactor temperature gradients, monomer concentration gradients, polymer concentration, and catalyst composition dispersion may be created using the stirred tank reactor depicted in FIG. 4 to produce polymer products with broadened molecular weight distribution as measured by Mw/Mn, wherein the Mw/Mn may be greater than 2.3, or 2.5, or 3.0, or 3.5, or 4.0, or 5.0.

Figure 5:
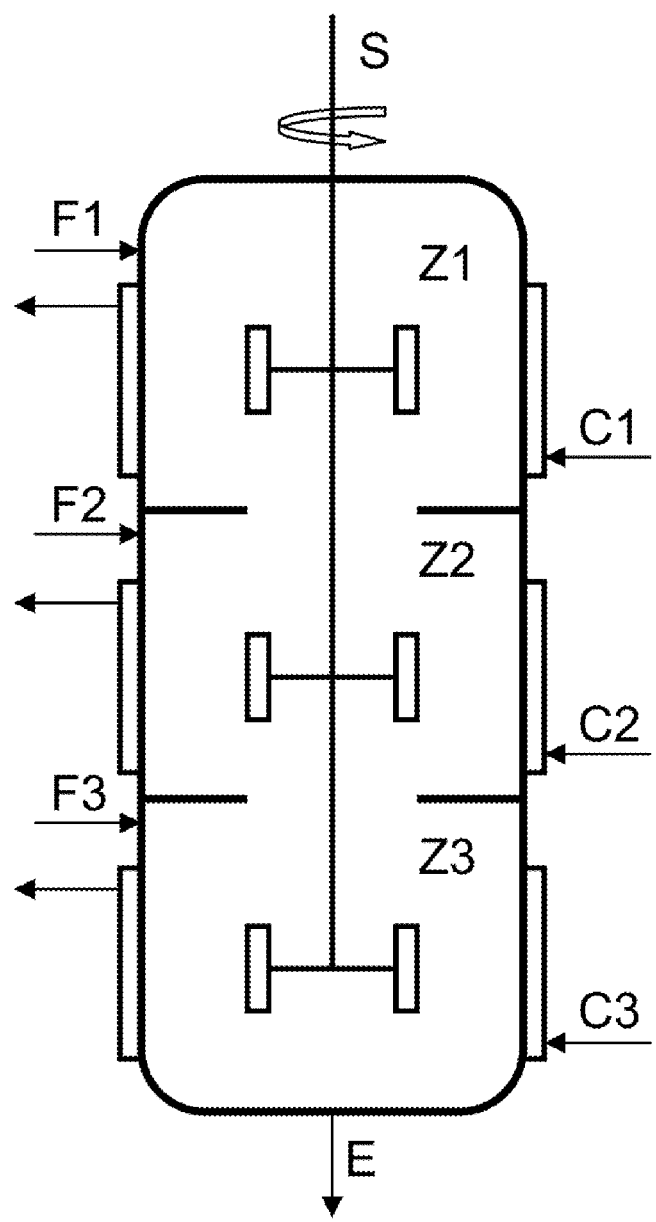
FIG. 5 depicts an exemplary schematic of a stirred tank reactor with baffled jacketed zones and multiple injection ports to create gradients of temperature and/or concentration of monomer and/or polymer.

FIG. 5 depicts an exemplary schematic of a stirred tank reactor with baffled jacketed zones and multiple injection ports to create gradients of temperature and/or concentration of monomer and/or polymer and/or catalyst composition dispersion. The reactor temperature gradients, monomer concentration gradients, polymer concentration, and catalyst composition dispersion, and combinations thereof discussed above with respect to FIG. 4 may also be created using the stirred tank reactor depicted in FIG. 5 to produce polymer products with broadened molecular weight distribution as measured by Mw/Mn. FIG. 5 differs from FIG. 4 in having baffled jacketed zones for reactor zones Z1, Z2 and Z3 and thus allowing the creation of a controlled temperature gradient within the reactor. Cooling streams C1, C2, C3 are used to provide the cooling media to reactor zones Z1, Z2 and Z3, respectively. The baffled jacketed zones allow for a reactor temperature gradient to be created within the reactor via heat exchange through the reactor walls. Hence, the reactor temperature gradient may yield polymer product with different molecular weight and broadened molecular weight distribution through control of the creation and control of the temperature gradient in the reactor. Similar effect may be achieved by placing heat-exchanger surfaces, for example cooling coils or tuber bundles within the reactor. This technique may be used to create a temperature gradient within the reactor of greater than 15° C., or greater than 20° C., or greater than 25° C., or greater than 30° C., or greater than 35° C., or greater than 40° C., or greater than 45° C., or greater than 50° C., or greater than 60° C., or greater than 65° C., or greater than 70° C., or greater than 75° C., or greater than 80° C., or greater than 85° C., or greater than 90° C., or greater than 95° C., or greater than 100° C. to produce a polymer product with a broader molecular weight distribution than would be produced without the reactor temperature gradient. More particularly, the broader molecular weight as measured by Mw/Mn may be greater than 2.3, or 2.5, or 3.0, or 3.5, or 4.0, or 4.5, or 5.0.

Figure 6:
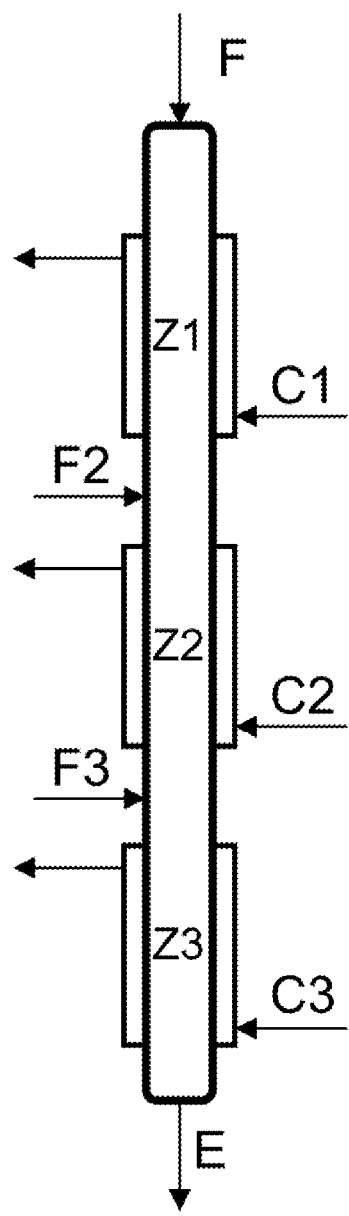
FIG. 6 depicts an exemplary schematic of a tubular reactor with jacketed cooling zones and multiple injection ports to create gradients of temperature and/or concentration of monomer and/or polymer.

FIG. 6 depicts an exemplary schematic of a tubular reactor with jacketed cooling zones and multiple injection ports to create gradients of temperature and/or concentration of monomer and/or polymer. The reactor temperature gradients, monomer concentration gradients, polymer concentration, and catalyst composition dispersion, and combinations thereof discussed above with respect to FIGS. 4 and 5 may also created using the tubular reactor depicted in FIG. 6 to produce polymer products with broadened molecular weight distribution as measured by Mw/Mn. FIG. 6 differs from FIG. 5 only in being a tubular reactor as opposed to a stirred tank reactor. FIG. 6 also has baffled jacketed zones for reactor zones Z1, Z2 and Z3. Cooling streams C1, C2, C3 are used to provide the cooling media to reactor zones Z1, Z2 and Z3, respectively. There are three reactor feed streams F1, F2 and F3 at different points along the length of the reactor. Feed stream F1 enters at one end of the tubular reactor and reactor effluent E exits at the other end of the tubular reactor. With a tubular reactor, a polymer concentration gradient may also be created via limited back mixing of the reactor content. Typically, tubular reactors have higher L/D ratios than tank reactors and the typical L/D ratio is greater than 50 or greater than 100.

The process for producing polymers with broadened molecular weight and/or composition distribution disclosed herein relates to processes to polymerize olefins comprising contacting one or more olefins having at least two carbon atoms with a suitable catalyst compound and an activator in a fluid reaction medium comprising one or two fluid phases in a reactor. In one embodiment, the fluid reaction medium is in its supercritical state. Catalyst precursor compound and activator may be delivered as a solution or slurry, either separately to the reactor, mixed in-line just prior to the reactor, or mixed and pumped as an activated solution or slurry to the reactor. In one particular embodiment, two solutions are mixed in-line. The catalyst feed may also be mixed in-line upstream of the reactor with other feed components, particularly with monomer-free feed components, such as scavengers and/or inert solvents/diluents. The catalyst feed and the monomer-containing feeds are typically not mixed upstream of the reactor to prevent polymerization under uncontrolled conditions and/or to prevent fouling caused by the polymer made at the typically lower temperatures of said feed streams as compared to the temperature of the reactor. Polymerizations may be carried out in a single reactor operation, in which monomer, comonomers, catalyst(s)/activator(s), scavenger(s), and optional solvent(s) are added continuously to a single reactor.

Polymerization processes of the process for producing polymers with broadened molecular weight distribution disclosed herein also comprehend high-pressure reactors where the reactor is substantially unreactive with the polymerization reaction components and is able to withstand the high pressures and temperatures that occur during the polymerization reaction. Withstanding these high pressures and temperatures may allow the reactor to maintain the fluid reaction medium in its supercritical condition. Higher pressures may also be required to maintain liquid-filled reactor conditions in solution polymerization, i.e., pressures above the bubble point of the liquid polymerization system. Non-limiting exemplary reactors include high-pressure autoclave, pump-around loop or autoclave, and tubular, reactors, and any combination thereof.

The polymerization processes of the process for producing polymers with broadened molecular weight distribution may operate efficiently in autoclave (also referred to as stirred tank) and tubular reactors. Typically, autoclave reactors have length-to-diameter ratios of 1:1 to 20:1 and are fitted with a high-speed (up to 2000 RPM) multiblade stirrer and baffles arranged for optimal mixing. Commercial autoclave pressures are typically greater than 5 MPa with a maximum of typically less than 260 MPa. The maximum pressure of commercial autoclaves, however, may become higher with advances in mechanical and material science technologies.

Tubular reactors may also be used in the process for producing polymers with broadened molecular weight distribution disclosed herein and more particularly tubular reactors capable of operating up to about 350 MPa. Tubular reactors are fitted with external cooling and one or more injection or feed points along the (tubular) reaction zone. As in autoclaves, these injection points serve as entry points for monomers (such as propylene), one or more comonomer, catalyst, or mixtures of these. In tubular reactors, external cooling often allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Alternatively, tubular reactors may be fabricated with smooth, unpolished internal surfaces to address wall deposits. Tubular reactors generally may operate at pressures of up to 360 MPa, may have lengths of 100-2000 meters or 100-4000 meters, and may have internal diameters of less than 12.5 cm. Typically, tubular reactors have length-to-diameter ratios of 10:1 to 50,000:1 and include up to 10 different injection or feed positions along its length for the feed components.

In both autoclaves and tubular reactors, at injection, feeds are typically cooled to near ambient temperature or below to provide maximum cooling and thus maximum polymer production within the limits of maximum operating temperature. In autoclave operation, a preheater may operate at startup, but not after the reaction reaches steady state if the first mixing zone has some back-mixing characteristics. In tubular reactors, the first section of double-jacketed tubing may be heated (especially at start ups) rather than cooled and may operate continuously. A well-designed tubular reactor is characterized by plug flow wherein plug flow refers to a flow pattern with minimal radial flow rate differences. In both multizone autoclaves and tubular reactors, catalyst can not only be injected at the inlet, but also optionally at one or more points along the reactor. The catalyst feeds injected at the inlet and other injection points can be the same or different in terms of content, density, and concentration. Catalyst feed selection allows polymer design tailoring within a given reactor or reactor train and/or maintaining the desired productivity profile along the reactor length.

Homogeneous Polymerization Process Details

The remainder of the description sets forth the details of the homogenous polymerization processes (homogeneous supercritical, solution and advanced solution processes) where the processes and reactor designs previously described for broadening polymer molecular weight and/or composition distribution are advantageous. The advantageous processes and reactors for broadening polymer molecular weight and/or composition distribution disclosed herein include a reactor that operates with a homogeneous dense fluid polymerization system. Polymerization processes that operate in a homogenous dense fluid phase use either inert solvent(s) or monomer(s) or their mixtures as a solvent/diluent in their liquid or supercritical state. Hence, the one or more reactors disclosed herein operate with polymerization systems in their homogeneous supercritical or in their liquid state. When operating with liquid polymerization systems, the disclosed designs and conditions are particularly advantageous in the liquid-filled reactor operation mode. In both the supercritical and solution polymerization reactors, the process may be a bulk polymerization process operating with less than 40%, or less than 30%, or less than 20 wt % or less than 10 wt % or less than 5 wt % of inert solvent present in the reactor, and in some embodiments, with bulk monomers essentially free (less than 1 wt %) of inert solvents. In one embodiment of the disclosed process, the reactor operates at bulk homogeneous supercritical conditions as has been disclosed in U.S. patent application Ser. Nos. 11/433,889 and 11/177,004, herein incorporated by reference in their entirety.

In another embodiment, the reactor operates at conditions where the polymer dissolution is substantially aided by an inert solvent (solution process where the polymerization medium contains more than 40 wt % solvent, typically more than 60 wt % solvent) as has been disclosed in PCT Publication No. WO 2006/044149, herein incorporated by reference in its entirety. Both solution and homogeneous supercritical polymerization processes providing polymers in a homogeneous fluid state may be performed in a bulk monomer phase using essentially pure monomer(s) as solvent or may keep the polymer in the homogeneous fluid state by employing an inert solvent in substantial concentrations (i.e., 40 wt % or more). The solution process provides for a polymer-containing liquid phase either in an inert solvent or in the essentially neat monomer or in their mixture in their liquid state. The homogeneous supercritical process provides for the polymeric fluid state by dissolving the polymeric product either in an inert solvent or in the essentially neat monomer or in their mixture in their supercritical state.

In another embodiment, the improved process for producing polymers with broadened molecular weight distribution disclosed herein may be incorporated as one or more of the reactors with the improved in-line process for blending polymers to improve blend quality and reduce the capital and operating costs associated with a combined polymerization and blending plant disclosed in U.S. patent application Ser. No. 12/002,509 filed on Dec. 17, 2007, and U.S. patent application Ser. No. 12/074,496 filed on Mar. 4, 2008 herein incorporated by reference in their entirety.

In one or more embodiments, the process includes contacting, in a polymerization system, one or more monomers (advantageously propylene) with a catalyst, an activator, optionally comonomer (advantageously ethylene, butene-1, hexene-1, or octene-1, and combinations thereof), and optionally inert diluent or solvent, at a temperature above 40° C., or above 50° C., or above 60° C., or above 70° C., or above 80° C. and at a pressure above 1 MPa, or above 5 MPa, or above 10 MPa, or above 13 MPa. The polymerization takes place in a homogeneous polymerization system within the reactor.

In one or more embodiments, the density of the polymerization system is about 0.3 g/mL or more, or about 0.4 g/mL or more, or about 0.5 g/mL or more, or about 0.6 g/mL or more. In one or more embodiments, the density of the polymerization system is of from 0.3 g/mL to 0.75 g/mL, or from 0.35 to 0.70 g/mL In one or more embodiments, the steady state polymer yield (i.e., conversion of monomer to polymer product) per pass is at least 5 wt % of the monomer, or at least 10 wt % of the monomer, or at least 20 wt % of the monomer, or at least 30 wt % of the monomer, or at least 40 wt % of the monomer, or at least 50 wt % of the monomer, or at least 60 wt % of the monomer, or at least 70 wt % of the monomer, or at least 80 wt % of the monomer, or at least 90 wt % of the monomer.

In one or more embodiments, the polymerization conditions are sufficient to dissolve the polymer product in the monomer(s) present in the liquid state (i.e. "bulk solution polymerization"). In one or more embodiments, the polymerization conditions are sufficient to dissolve the polymer product in the monomer(s) present in the supercritical state (i.e. "bulk homogeneous supercritical polymerization"). In one or more embodiments, the critical temperature and pressure of reactor blends are different from the critical values of pure components, and thus supercritical operations at temperatures lower than the critical temperature of one or more of the pure monomers (e.g., 92° C. for propylene) are possible. In one or more embodiments, near-amorphous materials with low melting points as well as amorphous materials can be produced without fouling even below the critical temperature of the reactor blends, i.e., at temperatures that correspond to the condensed liquid state of the polymerization system in the reactor. In these instances, the operating temperature can be below the boiling point of the reaction mixture and thus the reactor can operate at what is often referred to as liquid-filled conditions. In some instances, such operation mode could be desired to achieve high molecular weight (MW) and thus low melt flow rate (MFR), particularly in the manufacture of copolymers, such as propylene-ethylene or ethylene-higher olefin copolymers.

In one or more embodiments, the polymerization temperature is above the cloud point temperature of the single-phase polymerization system at the reactor pressure. More advantageously, the temperature is 2° C. or more above the cloud point temperature of the polymerization system at the reactor pressure. In another embodiment, the temperature is between 40 and 250° C., between 50 and 200° C., between 60 and 180° C., or between 70 and 150° C. In another embodiment, the temperature is above 40, 50, 60, 70, 80, 90, 95, 100, 110, or 120° C. In another embodiment, the temperature is below 250, 200, 190, 180, 170, 160, or 150° C. In one or more embodiments, the polymerization temperature is from about 40° C. to about 190° C. In one or more embodiments, the polymerization temperature is about 40° C. to about 160° C. In one or more embodiments, the polymerization temperature is about 40° C. to about 140° C. In one or more embodiments, the polymerization temperature is about 40° C. to about 130° C. In one or more embodiments, the polymerization temperature is about 40° C. to about 105° C. In one or more embodiments, the polymerization temperature is about 40° C. to about 95° C. In one or more embodiments, the polymerization temperature is about 40° C. to about 65° C.

In one or more embodiments, the polymerization temperature is above the solid-fluid phase transition temperature (crystallization temperature) of the polymerization system at the reactor pressure to afford fouling-free continuous polymerization. Advantageously, the temperature is at least 2° C. or at least 5° C. above the solid-fluid phase transition temperature of the polymerization system at the reactor pressure. More advantageously, the temperature is at least 10° C. above the solid-fluid phase transformation point of the polymerization system at the reactor pressure.

In one or more embodiments, the polymerization pressure is no lower than the fluid-fluid phase transition pressure (cloud point) of the polymerization system at the reactor temperature. In one or more embodiments, the polymerization pressure is no lower than 10 MPa below, or no lower than 5 MPa below, or no lower than 2 MPa below, or no lower than 1 MPa below, or no lower than 0.1 MPa below, or no lower than 0.01 MPa below the cloud point of the polymerization system at the reactor temperature. In one or more embodiments, the pressure is between 1 MPa and 300 MPa, or between 13.8 MPa and 200 MPa, or between 20 and 150 MPa, or between 5 MPa and 100 MPa. In one or more embodiments, the pressure is above 1, 5, 10, 15 20, 30, or 40 MPa. In one or more embodiments, the pressure is below 500, 300, 250, 200, 100, or 50 MPa. In one or more embodiments, the pressure is between 1 and 200 MPa, between 1 and 100 MPa, or between 1 and 50 MPa, or between 1 and 40 MPa, or between 1 and 30 MPa, or between 1 and 20 MPa, or between 1 and 15 MPa, or between 1 and 14 MPa, or between 1 and 13 MPa, or between 1 and 12 MPa, or between 1 and 11 MPa. In one or more embodiments, the pressure is about 13 MPa or more. In one or more embodiments, the pressure is about 13 MPa to about 42 MPa. In one or more embodiments, the pressure is about 13 MPa to about 35 MPa. In one or more embodiments, the pressure is about 13 MPa to about 28 MPa. In one or more embodiments, the pressure is about 13 MPa to about 20 MPa.

Monomers

Any monomer having one or more (non-conjugated) aliphatic double bond(s) and two or more carbon atoms may be used. Advantageous monomers include α-olefins, such as ethylene, propylene, butene-1, hexene-1, octene-1, decene-1, and dodecene-1, substituted olefins, such as styrene, paramethylstyrene, vinylcyclohexane, etc., non-conjugated dienes, such as vinylcyclohexene, etc., α,ω-dienes, such as 1,5-hexadiene, 1,7-octadiene, etc., cycloolefins, such as cyclopentene, cyclohexene, cyclohexadiene, etc., norbornene, and the like.

In one or more embodiments, olefin monomer or monomers can be used. Advantageous monomers include $C_2$ to $C_{100}$ olefins, advantageously $C_2$ to $C_{60}$ olefins, advantageously $C_3$ to $C_{40}$ olefins advantageously $C_3$ to $C_{20}$ olefins, advantageously $C_3$ to $C_{12}$ olefins. In some embodiments advantageous monomers include linear, branched or cyclic alpha-olefins, advantageously $C_3$ to $C_{100}$ alpha-olefins, advantageously $C_3$ to $C_{60}$ alpha-olefins, advantageously $C_3$ to $C_{40}$ alpha-olefins advantageously $C_3$ to $C_{20}$ alpha-olefins, advantageously $C_3$ to $C_{12}$ alpha-olefins. Advantageous olefin monomers can be one or more of propylene, butene, pentene, hexene, heptene, octene, nonene, decene, dodecene, 4-methylpentene-1,3-methylpentene-1, 3,5,5-trimethylhexene-1, and 5-ethylnonene-1.

In one or more embodiments, aromatic-group-containing monomers containing up to 30 carbon atoms can be used. Suitable aromatic-group-containing monomers comprise at least one aromatic structure, advantageously from one to three, more advantageously a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer can further be substituted with one or more hydrocarbyl groups including but not limited to $C_1$ to $C_{10}$ alkyl groups. Additionally two adjacent substitutions can be joined to form a ring structure. Advantageous aromatic-group-containing monomers contain at least one aromatic structure appended to a polymerizable olefinic moiety. Particularly advantageous aromatic monomers include styrene, alpha-methylstyrene, para-alkylstyrenes, vinyltoluenes, vinylnaphthalene, allyl benzene, and indene, especially styrene, paramethylstyrene, 4-phenyl-butene-1 and allylbenzene.

In one or more embodiments, non-aromatic cyclic group containing monomers can be used. These monomers can contain up to 30 carbon atoms. Suitable non-aromatic cyclic group containing monomers advantageously have at least one polymerizable olefinic group that is either pendant on the cyclic structure or is part of the cyclic structure. The cyclic structure can also be further substituted by one or more hydrocarbyl groups such as, but not limited to, $C_1$ to $C_{10}$ alkyl groups. Advantageous non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantad the like.

In one or more embodiments, diolefin monomer(s) can be used. Advantageous diolefin monomers include any hydrocarbon structure, advantageously $C_4$ to $C_{30}$, having at least two unsaturated bonds, wherein at least two of the unsaturated bonds are readily incorporated into a polymer by either a stereospecific or a non-stereospecific catalyst(s). It is further advantageous that the diolefin monomers be selected from alpha-omega diene monomers (i.e. divinyl monomers). More advantageously, the diolefin monomers are linear divinyl monomers, most advantageously those containing from 4 to 30 carbon atoms. Examples of advantageous dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly advantageous dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Advantageous cyclic dienes include cyclopentadiene, vinylnorbornene, norbornadiene, ethylidene norbornene, divinylbenzene, dicyclopentadiene or higher ring containing diolefins with or without substituents at various ring positions.

Polymer Product

In an advantageous embodiment, the process described can be used to produce homopolymers or copolymers. Advantageous polymers produced herein include homopolymers or copolymers of any of the above-described monomers. In an advantageous embodiment, the polymer is a homopolymer of any $C_3$ to $C_{12}$ alpha-olefin. Advantageously, the polymer is a homopolymer of propylene. In another embodiment the polymer is a copolymer comprising propylene and ethylene, and the copolymer comprises less than 60 wt % ethylene, less than 50 wt % ethylene, less than 40 wt % ethylene, or less than 30 wt % ethylene, or less than 20 wt % ethylene, or less than 10 wt % ethylene, or less than 5 wt % ethylene. In another embodiment, the polymer is a copolymer comprising propylene and one or more of the monomers listed above. In another embodiment, the copolymer comprises one or more diolefin comonomers, advantageously one or more $C_6$ to $C_{40}$ non-conjugated diolefins, more advantageously $C_6$ to $C_{40}$ α,ω-dienes.

In another embodiment, the polymer produced herein is a copolymer of propylene and one or more $C_2$ or $C_4$ to $C_{20}$ linear, branched or cyclic monomers, advantageously one or more $C_2$ or $C_4$ to $C_{12}$ linear, branched or cyclic alpha-olefins. Advantageously, the polymer produced herein is a copolymer of propylene and one or more of ethylene, butene, pentene, hexene, heptene, octene, nonene, decene, dodecene, 4-methyl-pentene-1,3-methyl pentene-1, and 3,5,5-trimethyl hexene-1.

In another advantageous embodiment, the polymer produced herein can be a copolymer of one or more linear or branched $C_3$ to $C_{30}$ prochiral alpha-olefins or $C_5$ to $C_{30}$ ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

In another embodiment, the polymer comprises propylene present at from 50 to 98 mol %, or 60 to 95 mol %, or 70 to 95 mol %, and a comonomer present at from 2 to 50 mol %, or 2 to 40 mol %, or 5 to 30 mol %, and a termonomer present at from 0 to 5 mol %, or from 0.5 to 5 mol %, or 1 to 3 mol %.

Catalyst Systems

The process for producing polymers with broadened molecular weight and/or composition distribution disclosed herein is particularly advantageous when used in conjunction with metallocene catalysts and other single site catalysts because these catalysts generally produce polymers with narrow molecular weight and composition distribution. The $M_w/M_n$ values for polymers made with metallocene catalyst systems in homogeneous polymerization media are typically close to the statistically expected value of 2.0. However, any polymerization catalyst capable of polymerizing the monomers disclosed can be used if the catalyst is sufficiently active under the polymerization conditions disclosed herein. Thus, Group-3-10 transition metals can form suitable polymerization catalysts. A suitable olefin polymerization catalyst will be able to coordinate to, or otherwise associate with, an alkenyl unsaturation. Illustrative, but not limiting, olefin polymerization catalysts include Ziegler-Natta catalyst compounds, metallocene catalyst compounds, late transition metal catalyst compounds, and other non-metallocene catalyst compounds.

As disclosed herein, Ziegler-Natta catalysts are those referred to as first, second, third, fourth, and fifth generation catalysts in the Propylene Handbook, E. P. Moore, Jr., Ed., Hanser, New York, 1996. Metallocene catalysts in the same reference are described as sixth generation catalysts. One exemplary non-metallocene catalyst compound comprises non-metallocene metal-centered, heteroaryl ligand catalyst compounds (where the metal is chosen from the Group 4, 5, 6, the lanthanide series, or the actinide series of the Periodic Table of the Elements).

Just as in the case of metallocene catalysts, these non-metallocene metal-centered, heteroaryl ligand catalyst compounds are typically made fresh by mixing a catalyst precursor compound with one or more activators. Non-metallocene metal-centered, heteroaryl ligand catalyst compounds are described in detail in PCT Patent Publications Nos. WO 02/38628, WO 03/040095 (pages 21 to 51), WO 03/040201 (pages 31 to 65), WO 03/040233 (pages 23 to 52), WO 03/040442 (pages 21 to 54), WO 2006/38628, and U.S. patent application Ser. No. 11/714,546, each of which is herein incorporated by reference.

Particularly useful metallocene catalyst and non-metallocene catalyst compounds are those disclosed in paragraphs [0081] to [0111] of U.S. Ser. No. 10/667,585 and paragraphs [0173] to [0293] of U.S. Ser. No. 11/177,004, the paragraphs of which are herein incorporated by reference.

The processes disclosed can employ mixtures of catalyst compounds to select the properties that are desired from the polymer. Mixed catalyst systems can be employed in the processes for producing polymers with broadened molecular weight and/or composition distribution disclosed herein to alter or select desired physical or molecular properties. For example, mixed catalyst systems can control the molecular weight distribution and tacticity of isotactic polypropylene when used with the disclosure processes or for the disclosure polymers. In one embodiment of the processes disclosed herein, the polymerization reaction(s) can be conducted with two or more catalyst compounds at the same time. In particular, two different catalyst compounds can be activated with the same or different activators and introduced into the polymerization system at the same or different locations. These systems can also, optionally, be used with diene incorporation to facilitate long-chain branching using mixed catalyst systems and high levels of vinyl-terminated polymers. The process of the present disclosure can use one or more catalysts in the reactor of the polymerization reactor section. For practical reasons, no more than five catalysts are advantageous and no more than three catalysts are more advantageous in a given reactor.

The one or more catalysts deployed in the process of the present disclosure can be homogeneously dissolved in the polymerization system or can form a heterogeneous solid phase in the reactor. Operations with homogeneously dissolved catalysts are advantageous. When the catalyst is present as a solid phase in the polymerization reactor, it can be supported or unsupported. The process of the present disclosure can use any combination of homogeneous and heterogeneous catalysts simultaneously present in the polymerization reactor, i.e., the reactor of the polymerization section of the present disclosure can contain one or more homogeneous catalysts and one or more heterogeneous catalysts simultaneously.

The process of the present disclosure can use any combination of homogeneous and heterogeneous catalysts deployed in the polymerization reactor section of the present disclosure. One or more catalysts deployed in the process of the present disclosure can be supported on particles using fumed silica as support, which either can be dispersed in the fluid polymerization system or can be contained in a stationary catalyst bed.

When the supported catalyst particles are dispersed in the polymerization system, they can be left in the polymeric product or can be separated from the product prior to its crystallization from the fluid reactor effluent in a separation step that is downstream of the polymerization reactor section. If the catalyst particles are recovered, they either can be discarded or can be recycled with or without regeneration. The catalyst can also be supported on structured supports, such as monoliths comprising straight or tortuous channels, reactor walls, internal tubing, etc. These structured supports are well known in the art of heterogeneous catalysis.

When the catalyst(s) is (are) supported, operation with dispersed or otherwise defined particles is advantageous.

When the catalyst is supported on dispersed particles, operations without catalyst recovery are advantageous, i.e., the catalyst is left in the polymeric product of the process of the present disclosure. Unsupported catalysts dissolved in the polymerization system are most advantageous. The catalyst(s) can be introduced any number of ways to the reactor. For example, the catalyst(s) can be introduced with the monomer-containing feed or separately.

In addition, the catalyst(s) can be introduced through one or multiple ports to the reactor. If multiple ports are used for introducing the catalyst(s), those ports can be placed at essentially the same or at different positions along the length of the reactor. If multiple ports are used for introducing the catalyst(s), the composition and the amount of catalyst feed through the individual ports can be the same or different. Adjustment in the amounts and types of catalyst through the different ports enables the modulation of polymer properties, such as molecular weight distribution, composition, composition distribution, crystallinity, etc.

Activators and Activation Methods for Catalyst Compounds

The catalyst compounds described herein are combined with activators for use herein. An activator is defined as any combination of reagents that increases the rate at which a metal complex polymerizes unsaturated monomers, such as olefins. An activator can also affect the molecular weight, degree of branching, comonomer content, or other properties of the polymer.

A. Aluminoxane and Aluminum Alkyl Activators:

In one form, one or more aluminoxanes are utilized as an activator in the in-line blending processes disclosed herein. Aluminoxanes, sometimes called alumoxanes in the art, are generally oligomeric compounds containing —Al(R)—O— subunits, where R is an alkyl group. Examples of aluminoxanes include methylaluminoxane (MAO), modified methylaluminoxane (MMAO), ethylaluminoxane and isobutylaluminoxane. Alkylaluminoxanes and modified alkylaluminoxanes are suitable as catalyst activators, particularly when the abstractable ligand is a halide. Mixtures of different aluminoxanes and modified aluminoxanes can also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1 and WO 94/10180.

When the activator is an aluminoxane (modified or unmodified), some embodiments select the maximum amount of activator at a 5000-fold molar excess Al/M over the catalyst compound (per metal catalytic site). The minimum activator-to-catalyst-compound is typically a 1:1 molar ratio.

B. Ionizing Activators:

It is contemplated to use an ionizing or stoichiometric activator, that is neutral or ionic, such as tri(n-butyl)ammonium tetrakis(pentafluorophenyl)-borate, a trisperfluorophenyl boron metalloid precursor or a trisperfluoro-naphtyl boron metalloid precursor, polyhalogenated heteroborane anions (WO 98/43983), boric acid (U.S. Pat. No. 5,942,459) or combination thereof as an activator herein. Also contemplated for use herein are neutral or ionic activators alone or in combination with aluminoxane or modified aluminoxane activators.

Examples of neutral stoichiometric activators include tri-substituted boron, aluminum, gallium and indium or mixtures thereof. The three substituent groups are each independently selected from alkyls, alkenyls, halogen, substituted alkyls, aryls, arylhalides, alkoxy and halides. The three groups are independently selected from halogen, mono or multicyclic (including halosubstituted) aryls, alkyls, and alkenyl compounds and mixtures thereof, advantageous are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternately, the three groups are alkyls having 1 to 4 carbon groups, phenyl, napthyl or mixtures thereof. Alternately, the three groups are halogenated, advantageously fluorinated, aryl groups. Alternately, the neutral stoichiometric activator is trisperfluorophenyl boron or trisperfluoronapthyl boron.

Ionic stoichiometric activator compounds can contain an active proton, or some other cation associated with, but not coordinated to, or only loosely coordinated to, the remaining ion of the ionizing compound. Such compounds and the like are described in European publications EP 0 570 982 A, EP 0 520 732 A, EP 0 495 375 A, EP 0 500 944 B1, EP 0 277 003 A and EP 0 277 004 A, and U.S. Pat. Nos. 5,153,157, 5,198, 401, 5,066,741, 5,206,197, 5,241,025, 5,384,299 and 5,502, 124 and U.S. patent application Ser. No. 08/285,380, filed Aug. 3, 1994, all of which are herein fully incorporated by reference.

C. Non-Ionizing Activators:

Activators are typically strong Lewis-acids which can play either the role of ionizing or non-ionizing activator. Activators previously described as ionizing activators can also be used as non-ionizing activators.

Abstraction of formal neutral ligands can be achieved with Lewis-acids that display an affinity for the formal neutral ligands. These Lewis-acids are typically unsaturated or weakly coordinated. Examples of non-ionizing activators include $R^{10}(R^{11})_3$, where $R^{10}$ is a group 13 element and $R^{11}$ is a hydrogen, a hydrocarbyl, a substituted hydrocarbyl, or a functional group. Typically, $R^{11}$ is an arene or a perfluorinated arene. Non-ionizing activators also include weakly coordinated transition metal compounds such as low valent olefin complexes.

Non-limiting examples of non-ionizing activators include $BMe_3$, $BEt_3$, $B(iBu)_3$, $BPh_3$, $B(C_6F_5)_3$, $AlMe_3$, $AlEt_3$, $Al(iBu)_3$, $AlPh_3$, $B(C_6F_5)_3$, aluminoxane, CuCl, Ni(1,5-cyclooctadiene)$_2$.

Additional neutral Lewis-acids are known in the art and will be suitable for abstracting formal neutral ligands. See in particular the review article by E. Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).

Suitable non-ionizing activators include $R^{10}(R^{11})3$, where $R^{10}$ is a group 13 element and $R^{11}$ is a hydrogen, a hydrocarbyl, a substituted hydrocarbyl, or a functional group. In one or more embodiments, $R^{11}$ is an arene or a perfluorinated arene.

Other non-ionizing activators include $B(R^{12})3$, where $R^{12}$ is an arene or a perfluorinated arene. Illustrative activators can include ionizing and non-ionizing activators based on perfluoroaryl borane and perfluoroaryl borates such as $PhNMe_2H+$ $B(C_6F_5)_4^-$, $(C_6H_5)_3C^+$ $B(C_6F_5)_4^-$, and $B(C_6F_5)^3$. Additional activators that can be used are described in WO 03/064433A1, which is incorporated by reference herein.

Supports

In another embodiment, the catalyst compositions of this disclosure include a support material or carrier. For example, the one or more catalyst components and/or one or more activators can be deposited on, contacted with, vaporized with, bonded to, or incorporated within, adsorbed or absorbed in, or on, one or more supports or carriers.

The support material is any of the conventional support materials. Advantageously, the supported material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The advantageous support materials are inorganic oxides that include those Group 2, 3, 4, 5, 13 or 14 metal oxides. The advantageous supports include silica, which can or can not be dehydrated, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP 0 511 665 B1), phyllosilicate, zeolites, talc, clays (U.S. Pat. No. 6,034,187) and the like. In addition, combinations of these support materials can be used, for example, silica-chromium, silica-alumina, silica-titania and the like. Additional support materials can include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

It is advantageous that the support material, most advantageously an inorganic oxide, has a surface area in the range of from about 10 to about 700 m$^2$/g, pore volume in the range of from about 0 to about 4.0 mL/g and average particle size in the range of from about 0.02 to about 50 μm. More advantageously, the surface area of the support material is in the range of from about 50 to about 500 m$^2$/g, pore volume of from about 0 to about 3.5 cc/g and average particle size of from about 0.02 to about 20 μm. Most advantageously the surface area of the support material is in the range is from about 100 to about 400 m$^2$/g, pore volume from about 0 to about 3.0 mL/g and average particle size is from about 0.02 to about 10 μm.

Non-porous supports can also be used as supports in the processes described herein. For example, in a advantageous embodiment the nonporous, fumed silica supports described in U.S. Pat. No. 6,590,055 can be used.

Additional useful activators for use in the processes of this disclosure include clays that have been treated with acids (such as $H_2SO_4$) and then combined with metal alkyls (such as triethylaluminum) as described in U.S. Pat. No. 6,531,552 and EP 1 160 261 A1, which is incorporated by reference herein.

Scavengers

Compounds that destroy impurities without destroying the catalyst are referred to as scavengers by one skilled in the art of polymerization. Impurities can harm catalysts by reducing their activity. Scavengers can be optionally fed to the reactor(s) of the process disclosed herein. Catalytic activity can be defined many different ways. For example, catalytic activity can be expressed as turnover frequency, i.e., the number of moles of monomers converted to the product in a unit time by one mole of catalyst. For a given reactor operating at the same residence time, catalytic activity can also be measured in terms of catalyst productivity, customarily expressed as the weight of polymer made by a unit weight of catalyst.

The scavengers for use in the processes disclosed herein can be different chemical compound(s) from the catalyst activator. Non-limiting exemplary scavengers include alkyl aluminum compounds, such as trimethyl aluminum, triethyl aluminum, tri-isobutyl aluminum, and trioctyl aluminum. The scavenger can also be the same as the catalyst activator and is generally applied in excess of what is needed to fully activate the catalyst. These scavengers include, but are not limited to, aluminoxanes, such as methyl aluminoxane. The scavenger can also be introduced to the reactor with the monomer feed or with any other feed stream. In one particular embodiment, the scavenger is introduced with the monomer-containing feed. The scavenger can be homogeneously dissolved in the polymerization polymerization system or can form a separate solid phase. In one particular embodiment, scavengers are dissolved in the polymerization system.

Solvents/Diluents

Advantageous solvents/diluents for use in the present disclosure include one or more of $C_2$-$C_{24}$ alkanes, advantageously propane, n-butane, isobutane, n-pentane, isopentane, n-hexane, mixed hexanes, isohexane, cyclopentane, cyclohexane, etc., single-ring aromatics, such as toluene and xylenes. In some advantageous embodiments, the diluent comprises one or more of methane, ethane, propane, butane, isobutane, isopentane, and hexanes. In advantageous embodiments, the solvent/diluent is recyclable.

Advantageous diluents also include $C_4$ to $C_{150}$ isoparaffins, advantageously $C_4$ to $C_{100}$ isoparaffins, advantageously $C_4$ to $C_{25}$ isoparaffins, more advantageously $C_4$ to $C_{20}$ isoparaffins. By isoparaffin is meant that the paraffin chains possess $C_1$ to $C_{10}$ alkyl branching along at least a portion of each paraffin chain. More particularly, the isoparaffins are saturated aliphatic hydrocarbons whose molecules have at least one carbon atom bonded to at least three other carbon atoms or at least one side chain (i.e., a molecule having one or more tertiary or quaternary carbon atoms), and advantageously wherein the total number of carbon atoms per molecule is in the range between 6 to 50, and between 10 and 24 in another embodiment, and from 10 to 15 in yet another embodiment. Various isomers of each carbon number will typically be present. The isoparaffins can also include cycloparaffins with branched side chains, generally as a minor component of the isoparaffin. Advantageously, the density (ASTM 4052, 15.6/15.6° C.) of these isoparaffins ranges from 0.65 to 0.83 g/cm$^3$; the pour point is −40° C. or less, advantageously −50° C. or less, the viscosity (ASTM 445, 25° C.) is from 0.5 to 20 cSt at 25° C.; and the average molecular weights in the range of 100 to 300 g/mol. Some suitable isoparaffins are commercially available under the trade name ISOPAR (ExxonMobil Chemical Company, Houston Tex.), and are described in, for example, U.S. Pat. Nos. 6,197,285, 3,818,105 and 3,439,088, and sold commercially as ISOPAR series of isoparaffins. Other suitable isoparaffins are also commercially available under the trade names SHELLSOL (by Shell), SOLTROL (by Chevron Phillips) and SASOL (by Sasol Limited). SHELLSOL is a product of the Royal Dutch/Shell Group of Companies, for example Shellsol™ (boiling point range=215-260° C.). SOLTROL is a product of Chevron Phillips Chemical Co. LP, for example SOLTROL 220 (boiling point=233-280° C.). SASOL is a product of Sasol Limited (Johannesburg, South Africa), for example SASOL LPA-210, SASOL-47 (boiling point=238-274° C.).

In another embodiment, advantageous diluents include $C_4$ to $C_{25}$ n-paraffins, advantageously $C_4$ to $C_{20}$ n-paraffins, advantageously $C_4$ to $C_{15}$ n-paraffins having less than 0.1%, advantageously less than 0.01% aromatics. Some suitable n-paraffins are commercially available under the trade name NORPAR (ExxonMobil Chemical Company, Houston Tex.), and are sold commercially as NORPAR series of n-paraffins. In another embodiment, advantageous diluents include dearomaticized aliphatic hydrocarbon comprising a mixture of normal paraffins, isoparaffins and cycloparaffins. Typically they are a mixture of $C_4$ to $C_{25}$ normal paraffins, isoparaffins and cycloparaffins, advantageously $C_5$ to $C_{18}$, advantageously $C_5$ to $C_{12}$. They contain very low levels of aromatic hydrocarbons, advantageously less than 0.1, advantageously less than 0.01 aromatics. Suitable dearomatized aliphatic hydrocarbons are commercially available under the trade name EXXSOL (ExxonMobil Chemical Company, Houston Tex.), and are sold commercially as EXXSOL series of dearomaticized aliphatic hydrocarbons.

In another embodiment the diluent comprises up to 20 wt % of oligomers of $C_6$ to $C_{14}$ olefins and/or oligomers of linear olefins having 6 to 14 carbon atoms, more advantageously 8 to 12 carbon atoms, more advantageously 10 carbon atoms having a kinematic viscosity of 10 or more (as measured by ASTM D 445); and advantageously having a viscosity index ("VI"), as determined by ASTM D-2270 of 100 or more.

In another embodiment, the diluent comprises up to 20 wt % of oligomers of $C_{20}$ to $C_{1500}$ paraffins, advantageously $C_{40}$ to $C_{1000}$ paraffins, advantageously $C_{50}$ to $C_{750}$ paraffins, advantageously $C_{50}$ to $C_{500}$ paraffins. In another embodiment, the diluent comprises up to 20 wt % of hydrofinished oligomers of 1-pentene, 1-hexene, 1-heptene, 1-octene, 1-nonene, 1-decene, 1-undecene and 1-dodecene. Such oligomers are commercially available as SHF and SuperSyn PAO's (ExxonMobil Chemical Company, Houston Tex.). Other useful oligomers include those sold under the trade names Synfluid™ available from ChevronPhillips Chemical Co. in Pasedena Texas, Durasyn™ available from BP Amoco Chemicals in London England, Nexbase™ available from Fortum Oil and Gas in Finland, Synton™ available from Crompton Corporation in Middlebury Conn., USA, EMERY™ available from Cognis Corporation in Ohio, USA.

In another embodiment, the diluent comprises a fluorinated hydrocarbon. Advantageous fluorocarbons for use in this disclosure include perfluorocarbons ("PFC" or "PFC's") and or hydrofluorocarbons ("HFC" or "HFC's"), collectively referred to as "fluorinated hydrocarbons" or "fluorocarbons" ("FC" or "FC's"). Fluorocarbons are defined to be compounds consisting essentially of at least one carbon atom and at least one fluorine atom, and optionally hydrogen atom(s). A perfluorocarbon is a compound consisting essentially of carbon atom and fluorine atom, and includes for example linear branched or cyclic, $C_1$ to $C_{40}$ perfluoroalkanes. A hydrofluorocarbon is a compound consisting essentially of carbon, fluorine and hydrogen. Advantageous FC's include those represented by the formula: CxHyFz wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most advantageously from 1 to 3, wherein y is an integer greater than or equal to 0 and z is an integer and at least one, more advantageously, y and z are integers and at least one. For purposes of this disclosure and the claims thereto, the terms hydrofluorocarbon and fluorocarbon do not include chlorofluorocarbons.

With regard to the polymerization system, advantageous diluents and solvents are those that are soluble in and inert to the monomer and any other polymerization components at the polymerization temperatures and pressures used.

Polymerization Process Configuration

The catalyst compound and activator can be delivered as a solution or slurry, either separately to the reactor, activated in-line just prior to the reactor, or preactivated and pumped as an activated solution or slurry to the reactor. An advantageous operation is two solutions used to generate the activated catalyst in-line, prior to feeding it to the reactor. Polymerizations yielding broadened molecular weight and/or composition distribution are carried out in a single reactor operation, in which monomer, comonomers, catalyst/activator, scavenger, and optional modifiers are added continuously to a single reactor. These individual reactors yielding broadened molecular weight and/or composition distribution may be connected in parallel or series to other reactors making the same or different products.

In general, feed inlet temperatures are generally near to or below ambient temperatures to provide cooling to the exothermic reaction in the reactor operating above the crystallization temperature of the polymer product.

The processes described herein can have residence times as short as 0.5 seconds and as long as an hour. In advantageous embodiments, the residence times are from 10 seconds to 60 minutes, advantageously from 15 seconds to 30 minutes, more advantageously from 30 seconds to 30 minutes, more advantageously from 2 minutes to 30 minutes. In some embodiments, the residence time can be selected from 10, 30, 45, 50 seconds, 1, 5, 10, 15, 20, 25, 30 and 60 minutes. Practical maximum residence times can be selected from 5, 10, 15, 30, 60 minutes. In general, disclosure processes choose residence times of from 1 minute to 60 minutes; more particularly 2 minutes to 30 minutes.

Dividing the total quantity of polymer that is collected during the reaction time by the amount of monomer added to the reaction yields the conversion rate. The monomer-to-polymer conversion rate for the described processes can be as high as 90%. For practical reasons, for example for limiting viscosity, lower conversions could be advantageous. In addition, for practical reasons, for example for limiting the cost of monomer recycle, minimum conversions could be advantageous. Thus, the process can be run at practical conversion rates of 80, 60 or less percent, 3-80, 5-80, 10-70, 15-70, 20-70, 25-60, 3-60, 5-60, 10-60, 15-60, 20-60, 10-50, 5-40, 10-40, 40-50, 15-40, 20-40, or 30-40 percent conversion, advantageously greater than 10, or greater than 20 percent conversion.

Catalyst productivities may range from 10 to 100,000 kg polymer/(g catalyst precursor compound). High levels of catalyst productivity can result in low residual ash in the polymer product. Residual total ash contents of less than 0.5 wt %, or less than 0.3 wt %, or less than 0.1 wt %, or less than 0.01 wt %, or less than 0.001 wt % are advantageous.

EXAMPLES

Propylene polymerization at Supercritical Conditions

All polymerizations were performed in bulk polymerization systems (i.e., without using solvent, except for what was introduced with the catalyst solution, which did not exceed 10 wt %) and without monomer recycle. All polymerization experiments were performed in a continuous stirred tank reactor (CSTR) made by Autoclave Engineers, Erie Pa. The reactor was designed for operating at a maximum pressure and temperature of 207 MPa (30 kpsi) and 225° C., respectively. The nominal reactor volume was 150 mL with a working volume of 127 mL (working volume lower due to reactor internals). The reactor was equipped with an electric heater and with a stirrer with a magnetic drive. A pressure transducer located on the monomer feed line measured the pressure in the reactor. The temperature was measured inside the reactor using a type-K thermocouple. The reactor was protected against over-pressurization by automatically opening an air-actuated valve (High Pressure Company, Erie, Pa.) in case the reactor pressure exceeded the preset limit. A flush-mounted rupture disk located on the side of the reactor provided further protection against catastrophic pressure failure. All product lines were heated to ~150° C. to prevent fouling. The reactor body had two heating bands that were controlled by a programmable logic control device (PLC). The reactor did not have cooling capability. Once the reactor lined out during polymerization, its temperature was controlled manually by adjusting the flow rates of the monomer and catalyst feeds. No external heating was necessary in most experiments, i.e. the reactor temperature was maintained by controlling the heat released by the polymerization process.

Two independent lock-hopper assemblies were used to manage the effluent flow from the reactor: one for waste collection during start up and shut down, and the other one for product collection during the balance period at lined out, steady state conditions. Each lock-hopper consisted of two air-actuated valves bracketing a short piece of high-pressure tubing. Changing the internal diameter and/or the length of the lock-hopper tube allowed the adjustment of the volume of the lock-hoppers. Aliquots of the reactor content were taken out continuously by running the lock-hopper valves in cycles. One lock-hopper cycle consisted of first opening and closing of the valve between the lock-hopper tube and the reactor followed by opening and closing the downstream valve. Adjustments in the frequency of the lock-hopper cycles allowed maintaining the desired reactor pressure at a preset feed rate. The volume and the frequency of the two lock-hoppers were always set the same to allow switching between the lock-hoppers without affecting the steady state condition of the reactor. A drain port on the bottom of the reactor was used to empty the reactor after each experiment.

The application of lock-hoppers for product removal afforded robust reactor operations independent of the properties of the polymer made and/or the polymer concentration in the effluent. This operation mode, however, introduced short-term fluctuations both in the pressure and the temperature of the reactor. Typical pressure and temperature fluctuations caused by the operation of the lock-hopper at 207 MPa (30 kpsi) reactor pressure were less than 20.7 MPa (3 kpsi) and 1.5° C., respectively. The reported reaction pressure and temperature values were obtained by calculating the averages of the pressure and temperature data acquired during the entire time of product collection, which can be referred to as balance period.

Propylene was fed from low-pressure cylinders equipped with a dip leg for liquid delivery to the reactor. Heating blankets provided heat to increase the cylinder head pressure to deliver the monomer to the feed pump at a pressure above the bubble point of the feed. The low-pressure monomer feed was also stabilized against bubble formation by cooling the pump head using chilled water running at 10° C. The monomer feed was purified using two separate beds in series: activated copper (reduced in flowing $H_2$ at 225° C. and 1 bar) for oxygen removal and molecular sieve (5 A, activated in flowing $N_2$ at 270° C.) for water removal. The purified monomer feed was fed by a diaphragm pump (Model MhS 600/11, ProMinent Orlita, Germany) through the stirrer head into the reactor. The monomer flow rate was measured by a Coriolis mass flow meter (Model PROline Promass 80, Endress and Hauser) that was located downstream of the purification traps on the low-pressure side of the feed pump. The pressure fluctuation in the reactor caused some minor fluctuation in the feed rate. The reported feed flows were determined by averaging the flow rate during the entire balance period.

The catalyst feed solution was prepared inside an argon-filled dry box (Vacuum Atmospheres). The atmosphere in the glove box was purified to maintain <1 ppm $O_2$ and <1 ppm water. All glassware was oven-dried for a minimum of 4 hours at 120° C. and transferred hot to the antechamber of the dry box. Stock solutions of the catalyst precursors and the activators were prepared using purified toluene and stored in amber bottles inside the dry box. Aliquots were taken to prepare fresh activated catalyst solutions before each polymerization experiment. Catalyst concentrations of the catalyst feed were adjusted to maintain the target reaction temperature at feed rates that introduced not more than 3-8 wt % of catalyst solvent (toluene) into the reactor. Due to the small scale and daily start-ups of our reactor, impurity levels were difficult to stabilize, thus catalytic activities varied from run to run. Nonetheless, catalytic activities were very high, particularly with non-coordinating anion activators, typically requiring catalyst concentrations on the order of 10 to 100 mol ppb in the combined feed to the reactor.

In a typical experiment, the reactor was preheated to ~10-15° C. below that of the desired reaction temperature. During the line-out period, the catalyst feed and lock-hopper rates were adjusted to reach and maintain the target reaction temperature and pressure. Once the reactor reached steady state at the desired conditions, product collection was switched from the waste collection to the on-balance product collection vessel. The reactor was typically run on-balance between 30 to 90 min, after which the effluent was redirected to the waste collection vessel and the reactor was shut down. The products were collected from the on-balance vessel. The products were vacuum-dried overnight at 70° C. before characterization. The conversion and reaction rates were determined based on the total feed used and the product yield during the balance period.

Anhydrous toluene from Sigma-Aldrich was used in catalyst preparation and for reactor flushing. Initially, it was used as received (18-liter stainless steel vessels, $N_2$ head pressure) for reactor rinsing and flushing. Later, copper and molecular sieve traps were installed in the toluene feed line, the description of which is given earlier for the gas feed (vide supra). Propylene Grade 2.5 (BOC) was obtained in #100 low-pressure cylinders. The methylaluminoxane (MAO) activator (10 wt % in toluene) was purchased from Albermarle Corporation and was used as received. Tri-isobutylaluminum (Sigma-Aldrich) was used for passivating the feed line and the reactor if they were exposed to air during maintenance.

Test Methods:
Differential Scanning Calorimetry for Measuring Crystallization and Melting Temperatures (Tcp and Tmp) and Heat of Fusion (ΔHf):

Peak crystallization temperature (Tcp), Peak melting temperature (Tmp) and heat of fusion (Hf, or ΔHf) were measured using Differential Scanning calorimetry (DSC) on reactor samples (with no nucleating agent added). This analysis was conducted using either a TA Instruments MDSC 2920 or a Q2000 Tzero DSC. The DSC was calibrated for temperature using four standards (Tin, Indium, cyclohexane, and water). Heat of fusion of Indium (28.46 J/g) was used to calibrate the heat flow signal. The reproducibility of peak melting temperature for polypropylene is within ±0.3° C. and heat of fusion is within 2%. Typically about 3 to 5 mg of polymer from the reactor was sealed in a standard aluminum pan with flat lids and loaded into the instrument at room temperature. Sample was cooled to −70° C. and heated at 10° C./min to 210° C. to acquire the melting data (first heat). This first heating provides the melting behavior for samples made in the reactor. Since thermal history influences melting and crystallization behavior, the sample was held for 5 minutes at 210° C. to destroy its thermal history. This was followed by cooling this sample to −70° C. at a cooling rate of 10° C./min to analyze its crystallization behavior at this cooling rate. The exothermic peak of crystallization was analyzed using the software provided by the vendor and the peak of crystallization (Tcp) is reported. The sample was held at this low temperature of −70° C. for about 10 minutes to equilibrate it and then heated back to 210° C. at 10° C./min to analyze the melting behavior (second heat). This gave the melting behavior of samples crystallized under controlled cooling conditions (10° C./min) The melting temperature reported is obtained by the analysis of the melting peak using the software provided by the vendor and corresponds to the peak of the melting transition (Tmp). All samples reported in this work showed relatively narrow, single melting peaks and the breadth of melting did not show any significant change for different catalysts. Area under the melting curve was used to determine the heat of fusion (ΔHf) in J/g using the software provided by the vendor. This heat of fusion is used to calculate the degree of crystallinity. The percent crystallinity is calculated using the formula: percent crystallinity=[area under the curve (J/g)/207.14 (J/g)]×100%. A value of 207.14 J/g or 8700 J/mol is the equilibrium heat of fusion for 100% crystalline polypropylene and is obtained from Ref: B. Wunderlich in "Thermal Analysis" Academic Press, page 418, 1990.

Melt-Flow Rate Measurements:
The Melt-Flow Rates (MFR) of polymers were determined by using Dynisco Kayeness Polymer Test Systems Series 4003 apparatus following the method described in the Series 4000 Melt Indexer Operation manual, Method B. The method follows ASTM D-1238, Condition L, 2.16 kg and 230° C. All samples were stabilized by using Irganox 1010.

Molecular weights (Mw, Mn and Mz) by Gel-Permeation Chromatography (GPC):

Molecular weight distributions were characterized using Gel-Permeation Chromatography (GPC), also referred to as Size-Exclusion Chromatography (SEC). Molecular weight (weight average molecular weight, Mw, number average molecular weight Mn, Viscosity average molecular weight, Mv, and Z average molecular weight, Mz) were determined using High-Temperature Gel-Permeation Chromatography equipped with a differential refractive index detector (DRI) to measure polymer concentrations (either from Waters Corporation with on-line Wyatt DAWN "EOS" and Waters GPCV viscometer detectors, or Polymer Laboratories with on-line Wyatt mini-DAWN and Viscotek Corporation viscometer detectors. Experimental details on the measurement procedure are described in the literature by T. Sun, P. Brant, R. R. Chance, and W. W. Graessley, Macromolecules, Volume 34, Number 19, 6812-6820, (2001).

The analysis was performed using a Waters GPCV 2000 (Gel Permeation Chromatograph) with triple detection. The three detectors were in series with Wyatt DAWN "EOS" MALLS18 angle laser light scattering detector first, followed by the DRI (Differential Refractive Index) then Differential Viscometer detector. The detector output signals are collected on Wyatt's ASTRA software and analyzed using a GPC analysis program. The detailed GPC conditions are listed in Table 1 below.

Standards and samples were prepared in inhibited TCB (1,2,4-trichlorobenzene) solvent. Four NBS polyethylene standards were used for calibrating the GPC. Standard identifications are listed in the table below. The samples were accurately weighed and diluted to a ~1.5 mg/mL concentration and recorded. The standards and samples were placed on a PL Labs 260 Heater/Shaker at 160° C. for two hours. These were filtered through a 0.45 micron steel filter cup then analyzed.

The concentration, c, at each point in the chromatogram is calculated from the baseline-subtracted DRI signal, IDRI, using the following equation:

$$c = K_{DRI} I_{DRI}/(dn/dc)$$

where KDRI is a constant determined by calibrating the DRI, and (dn/dc) is the same as described below for the LS analysis. Units on parameters throughout this description of the SEC method are such that concentration is expressed in g/cm3, molecular weight is expressed in g/mole, and intrinsic viscosity is expressed in dL/g.

For the light-scattering detector used at high temperature, the polymer molecular weight, M, at each point in the chromatogram is determined by analyzing the LS output using the Zimm model for static light scattering (M. B. Huglin, Light Scattering from Polymer Solutions, Academic Press, 1971):

$$\frac{K_o c}{\Delta R(\theta)} = \frac{1}{MP(\theta)} + 2A_c c$$

Here, $\Delta R(\theta)$ is the measured excess Rayleigh scattering intensity at scattering angle $\theta$, c is the polymer concentration determined from the DRI analysis, A2 is the second virial coefficient, $P(\theta)$ is the form factor for a monodisperse random coil (described in the above reference), and Ko is the optical constant for the system:

$$K_o = \frac{4\pi^2 n^2 (dn/dc)^2}{\lambda^4 N_A}$$

in which NA is Avogadro's number, and (dn/dc) is the refractive index increment for the system. The refractive index, n=1.500 for TCB at 135° C. and $\lambda$=690 nm. In addition, A2=0.0006 for propylene polymers and 0.0015 for butene polymers, and (dn/dc)=0.104 for propylene polymers and 0.098 for butene polymers.

A high temperature Viscotek Corporation viscometer was used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta s$, for the solution flowing through the viscometer is calculated from their outputs. The intrinsic viscosity, $[\eta]$ i, at each point in the chromatogram is calculated from the following equation:

$$[\eta]_i = \eta_{s,i}/C_i$$

where the concentration, Ci, was determined from the DRI output.

The branching index (g') is calculated using the output of the SEC-DRI-LS-VIS method as follows. The branching index g' is defined as: Sample measured $[\eta]$/calculated theoretical $[\eta]$ of a linear polymer, where the calculated theoretical $[\eta]$ of a linear=k M$\alpha$
where k=0.0002288 and $\alpha$=0.705 for propylene polymers.

Mv is the viscosity average molecular weight based on molecular weights determined by light-scattering (LS) analysis. The viscosity average molecular weight, Mv, of the sample is calculated by:

$$Mv = \{\Sigma h_i M_i^\alpha / \Sigma h_i\}^{1/\alpha}$$

Mi=molecular weight for each time slice, hi, from the chromatogram, and the summations are carried out over all chromotographic slices, i.e., between the integration limits.

TABLE 1

| Gel Permeation Chromatography (GPC) measurement conditions | | |
|---|---|---|
| INSTRUMENT | | WATERS 2000V + Wyatt Dawn EOS |
| COLUMN | Type: | 3 x MIXED BED TYPE "B" 10 MICRON PD (high porosity col.'s) |
| | Length: | 300 mm |
| | ID: | 7.8 mm |
| | Supplier | POLYMER LABS |
| SOLVENT PROGRAM | A | 0.54 ml/min TCB inhibited GPC console setting was 0.5 mL/min to which 8% expansion factor (from Waters) makes actual flow 0.54 mL/min |
| DETECTOR | A: | Wyatt MALLS 17 angle's of laser light scattering detector |
| | B: | DIFFERENTIAL REFRACTIVE INDEX (DRI) in series |
| | C: | Viscometer IDvol. = +232.2 ul LS to DRI IDvol. = −91.8 ul Dp to DRI |
| TEMPERATURE | Injector: | 135° C. |
| | Detector: | 135° C. |
| | Column: | 135° C. |
| DISOLUTION CONDITIONS | | Shaken for 2 hours on a PL SP260 heater Shaker @160° C. |
| SAMPLE FILTRATION | | Through a 0.45µ SS Filter @ 135° C. |
| INJECTION VOLUME | | 329.5 µL |
| SAMPLE CONCENTRATION | | 0.15 w/v % (1.5 mg/ml) Target wt |
| SOLVENT DILUENT | | TCB inhibited |
| CALIBRATION NARROW PE STANDARDS | | NIST 1482a; NIST1483a; NIST1484a |
| BROAD PE STANDARD | | NIST 1475a |

Illustrative Example 1

Increasing MWD by Increasing the Temperature Difference Between the Fresh Feed Entering the Reactor and the Bulk of the Reactor Content (Reactor Temperature Dispersion Embodiment)

To demonstrate the effect of increased temperature difference between the reactor top and bottom created by an increasing temperature difference between the feed stream and the bulk of the reactor, the reactor temperature was increased while the feed temperature was kept constant (~25° C.). As shown in Table 2 below, the Mw/Mn stayed near the statistically predicted value of 2.0 until the bulk reactor temperature was increased to 130° C., then gradually increased to 3.5 when the bulk reactor temperature reached 189° C. A similar effect may also be achieved by keeping the reactor bulk temperature the same, but cooling the reactor feed, or by the combination of the two. Due to the correlation between MW and crystallinity, it is expected that these products also have broadened composition distributions. In particular, through manipulation of $\Delta T$ (reactor-feed) and appropriate baffling, mixing in the reactor, one can desirably create a high crystallinity, high MW component in isotactic PP (and syndiotactic PP) products. The high MW component in isotactic PP products will provide improved crystallization kinetics and solid state product properties in a variety of polypropylene products, including fibers, molded objects, and films.

TABLE 2

The effect of increasing difference between the temperatures of the feed and the reactor bulk using the same reactor and same stirrer design and speed

| | Reactor conditions | | | | | DRI | | |
|---|---|---|---|---|---|---|---|---|
| Synthesis number | Al/Zr mol/mol | Zr mol ppm | Temp °C. | Conv. % | Res. time min | Mw kg/mol | Mn kg/mol | Mw/Mn |
| 24519-122 | 411 | 0.06 | 119 | 11 | 4.9 | 248 | 119 | 2.08 |
| 24519-148 | 411 | 0.15 | 119 | 15 | 6.3 | 217 | 102 | 2.13 |
| 24592-002 | 411 | 0.17 | 122 | 18 | 6.0 | 173 | 73 | 2.36 |
| 24519-106 | 411 | 0.32 | 122 | 18 | 6.2 | 154 | 50 | 3.06 |
| 24592-164 | 410 | 0.07 | 132 | 12 | 5.9 | 179 | 84 | 2.14 |
| 24592-156 | 410 | 0.08 | 132 | 12 | 5.8 | 169 | 80 | 2.10 |
| 24592-129 | 412 | 0.11 | 131 | 13 | 5.9 | 174 | 78 | 2.24 |
| 24592-119 | 412 | 0.13 | 131 | 15 | 6.1 | 170 | 72 | 2.36 |
| 24592-114 | 412 | 0.13 | 131 | 18 | 7.2 | 156 | 78 | 2.01 |
| 24519-128 | 411 | 0.20 | 149 | 15 | 5.4 | 85 | 39 | 2.19 |
| 24519-132 | 411 | 0.19 | 163 | 19 | 6.0 | 54 | 24 | 2.28 |
| 24519-138 | 411 | 0.27 | 175 | 17 | 6.4 | 34 | 11 | 3.22 |
| 24519-143 | 411 | 0.44 | 189 | 12 | 5.9 | 22 | 6 | 3.48 |

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present disclosure, other and further embodiments of the disclosure can be devised without departing from the basic scope thereof, and the scope thereof is determined by the claims that follow.

What is claimed is:

1. A continuous process for producing polymers in a homogeneous polymerization system, comprising:
   (a) providing a tubular, a loop or a stirred tank reactor with two or more feed entry ports;
   (b) feeding to the reactor through the two or more feed entry ports two or more reactor feed streams with the two or more reactor feed streams comprising: 1) two or more monomers; 2) one or more catalyst systems; 3) optional one or more scavengers; 4) optional one or more diluents or solvents; and 5) combinations thereof;
   wherein the reactor is at a temperature above the solid-fluid phase-transition temperature of the polymerization system and a pressure no lower than 10 MPa below the cloud point pressure of the polymerization system and less than 1500 MPa;
   wherein the polymerization system for the reactor is in its dense fluid state and comprises the two or more monomers, any diluent or solvent present, any scavenger present, and the polymer product;
   wherein the one or more catalyst systems comprise one or more catalyst precursors, one or more catalyst activators, and optionally, one or more catalyst supports, wherein the one or more catalyst precursors are chosen from metallocene catalysts, non-metallocene metal-centered, heteroaryl ligand catalysts, and late transition metal catalysts;
   wherein at least one of the monomers is ted to the reactor at an upstream feed entry port and at least one of the monomers is fed to the reactor at one or more downstream feed entry ports;
   wherein the total number of monomers fed to the reactor through the upstream feed entry port is less than the total number of monomers fed to the reactor through the upstream feed entry port and the one or more downstream feed entry ports; and
   (c) forming a polymer reactor effluent including a homogeneous fluid phase polymer-monomer mixture in the reactor;
   wherein the concentration of at least one monomer in the polymerization system in a first reactor zone in a baffled reactor or at 5% downstream of the reactor length from the upstream feed entry port of a baffle-free reactor is at least 5% different from the concentration of the same at least one monomer in the polymerization system at the one or more downstream feed entry ports; and
   wherein the Mw/Mn of the polymer product is greater than 2.3.

2. The process of claim 1, wherein the one or more catalyst systems fed to the reactor comprise two or more catalyst precursors or two or more catalyst activators,
   wherein at least one of the catalyst systems is fed to the reactor at an upstream feed entry port of the reactor and at least one of the catalyst systems is fed to the reactor at one or more downstream feed entry ports of the reactor,
   wherein the total number of catalyst precursors or catalyst activators comprising the catalyst system in the reactor at the upstream feed entry port is less than the total number of catalyst precursors or catalyst activators of the catalyst system in the reactor at the one or more downstream feed entry ports, and
   wherein the concentration of at least one catalyst precursor or one catalyst activator component of the catalyst system in a first reactor zone in a baffled reactor or at 5% downstream of the reactor length from the upstream feed entry port of a baffle-free reactor is at least 5% different from the concentration of the same at least one catalyst precursor or one catalyst activator component of the catalyst system at the one or more downstream feed entry ports.

3. The process of claim 1, wherein the concentration of at least one monomer in the polymerization system in the first reactor zone in a baffled reactor or at 5% downstream of the reactor length from the upstream feed entry port of a baffle-free reactor is at least 10% different from the concentration of the same at least one monomer in the polymerization system at the one or more downstream feed entry ports.

4. The process of claim 1, wherein the concentration of at least one monomer in the polymerization system in the first reactor zone in a baffled reactor or at 5% downstream of the reactor length from the upstream feed entry port of a baffle-free reactor is at least 20% different from the concentration of the same at least one monomer in the polymerization system at the one or more downstream feed entry ports.

5. The process of claim 1, wherein the concentration of at least one monomer in the polymerization system in the first reactor zone in a baffled reactor or at 5% downstream of the reactor length from the upstream feed entry port of a baffle-free reactor is at least 30% different from the concentration of the same at least one monomer in the polymerization system at the one or more downstream feed entry ports.

6. The process of claim 1, wherein the Mw/Mn of the polymer product is greater than 3.0.

7. The process of claim 1, wherein the Mw/Mn of the polymer product is greater than 4.0.

8. The process of claim 1, wherein the Mw/Mn of the polymer product is greater than 5.0.

9. The process of claim 1, wherein the one or more monomers are chosen from ethylene, propylene, butenes, hexenes, octenes, decenes, dodecenes and combinations thereof.

10. The process of claim 1, wherein the polymer product is a polypropylene homopolymer, an ethylene-propylene copolymer, a propylene-butene-1 copolymer, or an ethylene-propylene-butene-1 terpolymer.

11. The process of claim 2, wherein the reactor further includes a means for minimizing back-mixing of the polymerization system in the reactor to create a polymer concentration gradient of 20 wt % or more, and
   wherein the polymer concentration gradient is defined as the polymer concentration in the reactor effluent minus the polymer concentration in a first zone of a baffled reactor or at 5% of the reactor length downstream of the feed entry port closest to the reactor head of a baffle-free reactor.

* * * * *